US012785529B2

(12) United States Patent
Beckhoff et al.

(10) Patent No.: US 12,785,529 B2
(45) Date of Patent: Nov. 3, 2026

(54) PLANAR DRIVE SYSTEM

(71) Applicant: Beckhoff Automation GmbH, Verl (DE)

(72) Inventors: Hans Beckhoff, Verl (DE); Johannes Beckhoff, Schloß Holte-Stukenbrock (DE); Jan Achterberg, Duisburg (DE); Dominik Sensen, Herzogenrath (DE); Lukas Bentfeld, Delbrück (DE); Felix Schulte, Rietberg (DE); Uwe Prüßmeier, Lemgo (DE)

(73) Assignee: Beckhoff Automation GmbH, Verl (DE)

( * ) Notice: Subject to any disclaimer, the term of this patent is extended or adjusted under 35 U.S.C. 154(b) by 296 days.

(21) Appl. No.: 18/432,851

(22) Filed: Feb. 5, 2024

(65) Prior Publication Data

US 2024/0178737 A1 May 30, 2024

Related U.S. Application Data

(63) Continuation of application No. PCT/EP2022/072517, filed on Aug. 11, 2022.

(30) Foreign Application Priority Data

Aug. 19, 2021 (DE) ..................... 10 2021 121 530.7

(51) Int. Cl.
*H02K 41/03* (2006.01)
*H02K 11/21* (2016.01)

(52) U.S. Cl.
CPC ........... *H02K 41/031* (2013.01); *H02K 11/21* (2016.01); *H02K 2201/18* (2013.01)

(58) Field of Classification Search
CPC .... B65G 54/02; H02K 11/21; H02K 2201/18; H02K 41/02
See application file for complete search history.

(56) References Cited

U.S. PATENT DOCUMENTS 9,878,813 B2 1/2018 Eberhardt et al.
10,432,063 B2 10/2019 Zahlen et al.
(Continued)

FOREIGN PATENT DOCUMENTS

DE 20100639 U1 4/2001
DE 102005009336 B4 8/2013
(Continued)

OTHER PUBLICATIONS

"B&R presents: ACOPOS 6D [sub: EN, ES, DE, IT, KO, PL, PT-BR, RU, ZH]," B&R Industrial Automation, <https://youtu.be/E5m2fBQsczs>.
(Continued)

*Primary Examiner* — Naishadh N Desai
(74) *Attorney, Agent, or Firm* — Dorsey & Whitney LLP

(57) ABSTRACT

A planar drive system has at least one stator assembly with a plurality of coil groups for generating a stator magnetic field, a stator surface above the stator assembly, and first and second rotors. The rotors each have a plurality of magnet units for generating a rotor magnetic field. The rotors can be moved above the stator surface in first and second directions, with the aid of an interaction of the stator magnetic field with the rotor magnetic field. A connection can be formed between the rotors with the aid of a coupling device. A controller is arranged to output control signals to the stator assembly. The stator assembly is configured to energize the coil groups on the basis of the control signals so that movements of the rotors, coordinated with one another with respect to the coupling device, are carried out with the aid of the stator magnetic field.

17 Claims, 27 Drawing Sheets

(56) References Cited

U.S. PATENT DOCUMENTS

| | | | | |
|---|---|---|---|---|
| 10,926,418 | B2 | 2/2021 | Lu et al. | |
| 11,437,902 | B2 | 9/2022 | Brinkmann et al. | |
| 11,962,214 | B2 * | 4/2024 | Holzleitner | H02K 41/031 |
| 12,068,656 | B2 * | 8/2024 | Lu | H02K 41/031 |
| 2003/0047416 | A1 | 3/2003 | Zimmer et al. | |
| 2017/0179805 | A1 | 6/2017 | Lu | |
| 2020/0030995 | A1 * | 1/2020 | Lu | B25J 15/0246 |
| 2021/0221008 | A1 * | 7/2021 | Lu | H02K 7/06 |
| 2022/0239212 | A1 | 7/2022 | Holzleitner | |
| 2023/0097926 | A1 | 3/2023 | Hauer et al. | |

FOREIGN PATENT DOCUMENTS

| | | | |
|---|---|---|---|
| DE | 102014214696 | A1 | 1/2016 |
| DE | 102016202825 | A1 | 8/2017 |
| DE | 102017208856 | A1 | 11/2018 |
| DE | 102017131304 | A1 | 6/2019 |
| WO | 2018176137 | A1 | 10/2018 |
| WO | 2020239930 | A1 | 12/2020 |
| WO | 2020239933 | A1 | 12/2020 |
| WO | 2021175885 | A1 | 9/2021 |

OTHER PUBLICATIONS

"Magnetic Levitation Using Inverted Planar Motor Technology," Philips Engineering Solutions, YouTube, <https://youtu.be/CEK7bfBLTCk>.

Office Action dated May 31, 2022 in connection with German patent application No. 10 2021 121 530.7, 14 pages including English translation.

International Preliminary Report on Patentability dated Jul. 26, 2023 in connection with International Patent Application No. PCT/EP2022/072517, 14 pages including English translation.

International Search Report and Written Opinion dated Nov. 25, 2022 in connection with International Patent Application No. PCT/EP2022/072517, 24 pages including English translation.

* cited by examiner

PLANAR DRIVE SYSTEM

CROSS-REFERENCE TO RELATED APPLICATIONS

The present patent application is a continuation of international Patent Application No. PCT/EP2022/072517, filed Aug. 11, 2022, entitled "Planar Drive System," which claims the priority of German patent application DE 10 2021 121 530.7, filed Aug. 19, 2021, entitled "Planarantriebssystem," each of which is incorporated by reference herein, in the entirety and for all purposes.

FIELD

The invention relates to a planar drive system and a method for operating a planar drive system.

BACKGROUND

Planar drive systems may inter alia be used in automation technology, in particular manufacturing technology, handling technology and process engineering. Planar drive systems may be used to move or position a moving element of a system or machine in at least two linearly independent directions. Planar drive systems may comprise a permanently energized electromagnetic planar motor having a planar stator and a rotor movable on the stator in at least two directions. In this context, the planar stator may be mounted in any mounting position and, for example, the rotor may be located above the stator, with respect to a normal direction towards the center of the earth. This means that the rotor may be placed on top of the stator when the planar drive system is switched off and may thus be held on the stator. However, other installation positions are also conceivable in which the rotor is held on the stator with the aid of magnetic forces generated by the stator, and in this case a weight force of the rotor is balanced by a magnetic force.

In a permanently energized electromagnetic planar motor, a driving force is exerted on the rotor by the fact that energized coil groups of a stator assembly interact magnetically with driving magnets of a plurality of magnet arrangements of the rotor. Planar drive systems with rectangular and elongated coil groups and rectangular and elongated magnet arrangements of the rotor are known from the prior art. Such a planar drive system is described, for example, in the disclosure document DE 10 2017 131 304 A1. With the aid of such a planar drive system, in particular a linear and translational movement of the rotor becomes possible. This means that with the aid of such a planar drive system, the rotor may be moved freely parallel to the stator surface above a stator surface under which the rectangular and elongated coil groups are arranged, and may be moved perpendicular with regard to the stator surface at least at different distances from the stator surface.

Furthermore, such a planar drive system is capable of tilting the rotor by a few degrees and rotating it by a few degrees. The aforementioned movements may be carried out above arbitrary points of the stator surface. The fact that the rotor may be tilted or rotated a few degrees provides a planar drive system with sufficient degrees of freedom for most applications. However, it may be that the intended use of the planar drive system requires further movements which cannot be carried out in this way with the aid of a rotor of the planar drive system.

SUMMARY

The present invention provides a planar drive system which allows larger degrees of freedom of movement of objects arranged on rotors. The present invention further provides a corresponding method of operation for such a planar drive system.

According to a first aspect, a planar drive system comprises at least one stator assembly having in each case a plurality of coil groups for generating a stator magnetic field, a stator surface above the stator assembly, and a first rotor and a second rotor, wherein the first rotor and the second rotor each comprise a plurality of magnet units for generating a rotor magnetic field, wherein the first rotor and the second rotor may be moved above the stator surface at least in a first direction and a second direction with the aid of an interaction of the stator magnetic field with the rotor magnetic field, wherein a coupling device is arranged between the first rotor and the second rotor, wherein a connection may be established between the first rotor and the second rotor with the aid of the coupling device, wherein the planar drive system comprises a controller, wherein the controller is set up to send control signals to the stator assembly, the stator assembly being set up to energize the coil groups on the basis of the control signals in such a way that movements of the first rotor and of the second rotor coordinated with one another with respect to the coupling device are carried out with the aid of the stator magnetic field According to a second aspect, a method for operating a planar drive system comprises at least one stator assembly having in each case a plurality of coil groups for generating a stator magnetic field, a stator surface above the stator assembly, and a first rotor and a second rotor, wherein the first rotor and the second rotor each comprise a plurality of magnet units for generating a rotor magnetic field, wherein the first rotor and the second rotor may be moved above the stator surface at least in a first direction and a second direction with the aid of an interaction of the stator magnetic field with the rotor magnetic field, wherein a coupling device is arranged between the first rotor and the second rotor, wherein with the aid of the coupling device a connection is established between the first rotor and the second rotor, wherein the planar drive system comprises a controller, the controller outputting control signals to the stator assembly, the stator assembly energizing the coil groups on the basis of the control signals in such a way that mutually coordinated movements of the first rotor and of the second rotor are carried out with the aid of the stator magnetic field According to a third aspect, a planar drive system comprises at least one stator assembly having in each case a plurality of coil groups for generating a stator magnetic field, a stator surface above the stator assembly, and a first rotor and a second rotor, wherein the first rotor and the second rotor each comprise a plurality of magnet units for generating a rotor magnetic field, wherein the first rotor and the second rotor may be moved above the stator surface at least in a first direction and a second direction with the aid of an interaction of the stator magnetic field with the rotor magnetic field, wherein a coupling device is arranged between the first rotor and the second rotor, wherein a connection may be established between the first rotor and the second rotor with the aid of the coupling device, wherein the planar drive system comprises a controller.

The controller is set up to send control signals to the stator assembly, the stator assembly being set up to energize the coil groups on the basis of the control signals in such a way that movements of the first rotor and of the second rotor coordinated with one another with respect to the coupling device are carried out with the aid of the stator magnetic field, wherein the stator assembly is arranged to energize the coil groups on the basis of the control signals in such a way that the connection may be released and may be formed again.

The controller may be operated in a first operating mode and in a second operating mode, wherein in the first operating mode, based on coupling information, the control signals are output in such a way that the connection of the first rotor and the second rotor is taken into account, and wherein in the second operating mode, based on decoupling information, the control signals are output in such a way that the first rotor and the second rotor are moved individually, wherein determining the coupling information or the decoupling information, respectively, is carried out on the basis of the position of the first rotor and of the second rotor taking into account a dimension of the coupling device, wherein magnetic field sensors provided in the stator modules detect the magnetic fields of the magnet units of the first rotor and of the second rotor in order to detect the position of the first rotor and of the second rotor.

EXAMPLES

A planar drive system comprises at least a stator assembly each comprising a plurality of coil groups for generating a stator magnetic field, a stator surface above the stator assembly, and a first rotor and a second rotor. The first rotor and the second rotor each comprise a plurality of magnetic units for generating a rotor magnetic field. The first rotor and the second rotor may be moved above the stator surface in a first direction and a second direction by an interaction of the stator magnetic field with the rotor magnetic field at least. It may be provided in this context that one or more stator assemblies are arranged in a stator module and the stator surface forms a continuous surface of the stator modules or of the stator assemblies. In particular, the stator surface may be configured substantially two-dimensionally in the first direction and the second direction, so that the first rotor and the second rotor may be moved substantially in parallel to the stator surface.

Furthermore, in the planar drive system according to the invention, a coupling device is arranged between the first rotor and the second rotor, with the aid of which a connection may be established between the first rotor and the second rotor. The planar drive system further comprises a controller, wherein the controller is arranged to output control signals to the stator assembly. The controller may further be arranged to receive signals from magnetic field sensors arranged in the stator modules and to use these signals for a position determination of the first rotor and second rotor, respectively. If a plurality of stator assemblies is present, the control signals may be output to a plurality of stator assemblies. If one or more stator assemblies are arranged in a stator module, it may be provided that the output of the control commands to the stator assemblies is configured as an output of control commands to the stator modules. The stator assembly is set up to energize the coil groups on the basis of the control signals in such a way that movements of the first rotor and of the second rotor coordinated with each other with respect to the coupling device are carried out with the aid of the stator magnetic field.

The coordinated movement allows an object placed on the first rotor and/or an object placed on the second rotor to be moved, as the case may be, in degrees of freedom that would not be possible with the first rotor or the second rotor individually. The coordinated movement may further comprise, when the connection between the first rotor and the second rotor is established, energizing the coil groups in such a way that an overall system consisting of the first rotor and the second rotor is moved without individually carrying out different movements of the first rotor and the second rotor.

The stator modules may comprise a stator module housing, wherein the stator assemblies of the stator modules are each arranged within the stator module housing.

In an embodiment, the connection may be released during operation and the stator assembly is arranged to energize the coil groups using the control signals in such a way that the connection may be released and re-established again. In this embodiment, the planar drive system is set up to connect the first rotor and the second rotor to each other with the aid of the coupling device and also to release the resulting connection again during operation. Thus, for example, within the framework of the use of the planar drive system in automation technology, movements of an object on, for example, the first rotor may be moved in degrees of freedom that would not be possible without coupling the first rotor to the second rotor.

In an embodiment, the controller may be operated in a first operating mode and in a second operating mode. In the first operating mode, the control signals are output based on coupling information in such a way that the existing connection of the first rotor and the second rotor is taken into account. In the second operation mode, the control signals are output based on decoupling information in such a way that the first rotor and the second rotor are moved individually. Thus, in the first operation mode, the connection between the first rotor and the second rotor is formed and the control signals are output for a joint coordinated movement of the first rotor and the second rotor. In the second mode of operation, the connection between the first rotor and the second rotor is disconnected and the control signals are output in such a way that the first rotor and the second rotor may be moved individually and independently of each other.

In an embodiment, the first rotor comprises a first coupling element and the second rotor comprises a second coupling element. The first coupling element and the second coupling element are part of the coupling device. A form-fit connection and/or a mechanical force-fit connection and/or a magnetic force-fit connection may be established between the first coupling element and the second coupling element. It may be provided that the form-fit connection and/or the mechanical force-fit connection and/or the magnetic force-fit connection are established by moving the first rotor and the second rotor relative to each other in a predetermined manner until the corresponding connection is formed. At first, the controller is thus operated in the second operating mode, in which the first rotor and the second rotor may be moved individually. After the connection has been established, the controller may then be switched to the first operating mode and the first rotor and the second rotor may be moved simultaneously in a coordinated manner.

In an embodiment, the first coupling element and the second coupling element provide a mechanical coupling between the first rotor and the second rotor. In an embodiment, the first coupling element and the second coupling element provide a magnetic coupling between the first rotor and the second rotor. It may also be provided, for example, that the first coupling element and the second coupling element provide both a mechanical coupling and a magnetic coupling.

In an embodiment, the first coupling element comprises a recess and the second coupling element comprises a protrusion matching or complementary to the recess. The connection is established by inserting the protrusion into the recess.

Insertion of the protrusion into the recess may be effected by a coordinated movement of the first rotor and the second rotor relative to each other.

In an embodiment, the first rotor and/or the second rotor may be tilted out of a plane defined by the first direction and the second direction to release the connection. This makes it possible, for example, for a force-fit connection of the first rotor and the second rotor in the plane defined by the first direction and the second direction to be allowed for with the aid of the protrusion and the recess, and for a movement of the first rotor or the second rotor in this plane to result in a movement of the respective other rotor due to the form-fit connection. The release of the connection may in this context be effected by tilting the first rotor and/or the second rotor out of the plane accordingly, thereby removing the protrusion from the recess. The first rotor and the second rotor may then be moved away from each other and subsequently tilted back to a normal position parallel to the stator surface, so that the first rotor and the second rotor may then again be moved individually and independently of each other.

In an embodiment, the first rotor and the second rotor may be tilted in opposite directions with regard to each other in order to release the connection.

In an embodiment, the first coupling element is integrated into a first circumferential edge element of the first rotor and the second coupling element is integrated into a second circumferential edge element of the second rotor.

In an embodiment, the first coupling element and the second coupling element comprise magnets. In an embodiment, the magnets of the first coupling element and/or the magnets of the second coupling element are supported in a rotatable manner. In this context, if the magnets are supported in a rotatable manner, a coupling device may be provided in which the magnets supported in a rotatable manner, when the first rotor and the second rotor are moved relative to each other, rotate to a position in such a way that a corresponding magnetic force is formed between the magnets between the first rotor and the second rotor, resulting in a coupling of the first rotor and the second rotor. Alternatively, the magnets may also be permanently installed at predetermined positions, in which case restrictions with regard to the coupling capability may have to be accepted.

In an embodiment, the coupling device is arranged to trigger a movement of an element arranged on the first rotor by a movement of the second rotor relative to the first rotor. The second rotor may thus be used to mechanically transmit a movement to an element of the first rotor via the coupling device. This may be carried out with both detachable and non-detachable connections between the first rotor and the second rotor.

Furthermore, a method for operating such a planar drive system is provided, wherein the planar drive system comprises the properties already mentioned. In this planar drive system, the controller outputs control signals to the stator assembly, and the stator assembly energizes the coil groups on the basis of the control signals in such a way that mutually coordinated movements of the first rotor and the second rotor are executed with the aid of the stator magnetic field.

In an embodiment of the method, the connection is released during operation, with the stator assembly energizing the coil groups based on the control signals in such a way that the connection is released and established again.

In an embodiment of the method, the controller may be operated in a first operating mode and in a second operating mode. In the first operating mode, the control signals are output based on coupling information in such a way that the connection of the first rotor and the second rotor is taken into account. In the second operation mode, the control signals are output based on decoupling information in such a way that the first rotor and the second rotor are moved individually.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
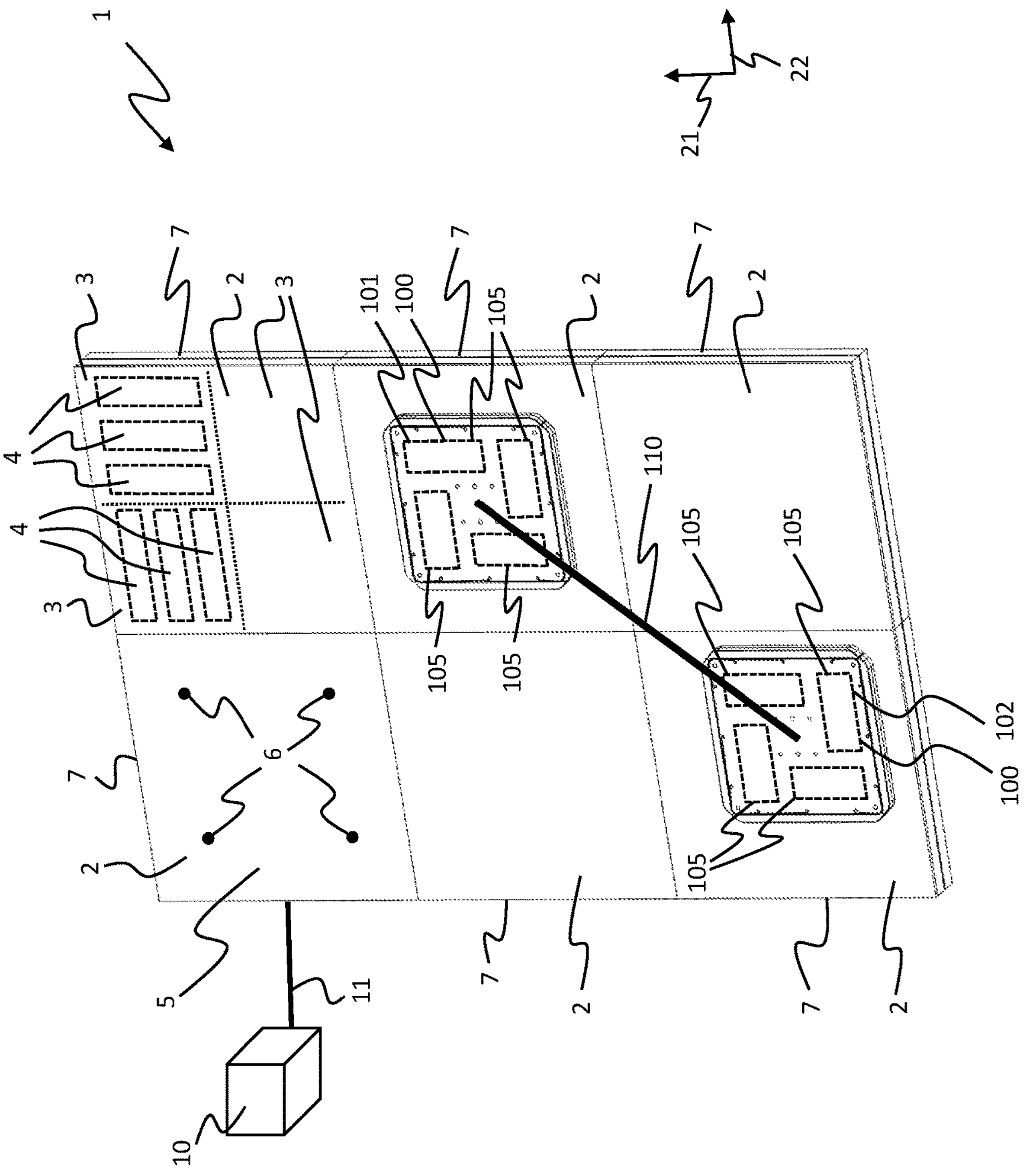
FIG. 1 shows a planar drive system.

FIG. 1 shows a planar drive system 1, which comprises six stator modules 2. The stator modules 2 are arranged in such a way that a rectangle of two on three stator modules 2 is formed. Other arrangements of the stator modules 2 are conceivable, as well, and more or fewer than six stator modules 2 may be arranged. In the stator module 2 shown above on the right, an interior of the stator module 2 is outlined, wherein the stator module 2 comprises four stator assemblies 3, the four stator assemblies 3 being arranged within a stator module 2 in a square 2-on-2 arrangement. Furthermore, it is shown for two stator assemblies 3 that the stator assemblies 3 comprise coil groups 4, wherein the coil groups 4 are shown with different alignments.

The coil groups 4 are used to generate a stator magnetic field. In the embodiment shown, the coil groups 4 are embodied as rectangular and elongated coil groups 4, but may also be embodied differently. In each stator assembly 3 of the stator modules 2, three individual rectangular and elongated coils are shown in a coil group 4. Likewise, in an embodiment, a different number of individual rectangular and elongated coils could form a coil group 4. In this context, a longitudinal extension of the coils is oriented in parallel to one of the edges of the respective stator assembly 3. Below each coil group 4 shown, further coils are present which have an orientation rotated by 90 degrees with respect to their longitudinal extension. This grid of elongated and rectangular coil groups 4 may be embodied one above the other multiple times. In real terms, neither stator assemblies 3 nor coil groups 4 are visible, since they are surrounded by a stator module housing 7 of the stator module 2.

The six stator modules 2 form a continuous stator surface 5 above the stator assemblies 3, the stator surface 5 being delimited by the stator module housings 7. Furthermore, a controller 10 is arranged, which is connected to one of the stator modules 2 by a data line 11. A communication link may also be embodied between the stator modules 2. The controller 10 is set up to output control signals via the data line 11 to the stator modules 2 or the stator assemblies 3 within the stator modules 2, and the stator assemblies 3 are set up to energize the coil groups 4 on the basis of the control signals. In this context, even if no stator assemblies 3 or coil groups 4 are shown in the other stator modules 2, each stator module 2 is equipped with stator assemblies 3 and coil groups 4. By energizing, the coil groups 4 may provide a stator magnetic field, and with the aid of the stator magnetic field, rotors 100 may be moved above the stator surface 5.

FIG. 1 shows two rotors 100, a first rotor 101 as well as a second rotor 102. Magnetic units 105 are indicated in both the first rotor 101 and the second rotor 102, which are not visible in the isometric view selected in FIG. 1, but which are arranged within the first rotor 101 as well as within the second rotor 102. The magnet units 105 generate a rotor magnetic field. In order to drive the rotors 100 above the stator surface 5, the rotor magnetic field may interact with the stator magnetic field generated by the coil assemblies 4 and thus drive the rotor 100 accordingly. With the aid of the interaction of the stator magnetic field generated by the coil groups 4 and the rotor magnetic field generated by the magnetic units 105, the rotors 100 may be moved in at least a first direction 21 and a second direction 22.

The first direction 21 and the second direction 22 are perpendicular with regard to each other and are arranged in a plane defined by the stator surface 5. To some extent, the rotors 100 may also be moved perpendicular with regard to the first direction 21 and the second direction 22. Furthermore, the rotors 100 may be rotated by a few degrees at any positions above the stator surface 5 and tilted by a few degrees from a resting position parallel to the stator surface 5. The first rotor 101 and the second rotor 102 are connected to each other with the aid of a coupling device 110. Thus, the coupling device 110 is arranged between the first rotor 101 and the second rotor 102. With the aid of the coupling device 110, a connection may be embodied between the first rotor 101 and the second rotor 102.

The controller 10 outputs the control signals to the stator assemblies 3 and the stator modules 2, respectively, in such a way that the coil groups 4 are energized based on the control signals in such a way that movements of the first rotor 101 and the second rotor 102 coordinated with each other with respect to the coupling device 110 are carried out with the aid of the stator magnetic field. Since the first rotor 101 and the second rotor 102 are connected via the coupling device 110, it is necessary to coordinate the movements of the first rotor 101 and the second rotor 102 during operation of the planar drive system 1, and thus to overall provide an improved planar drive system 1 with rotors 100 connected with the aid of the coupling device 110.

In the stator module 2 shown at the top left, it is outlined that the stator modules 2 may comprise magnetic field sensors 6 with the aid of which a magnetic field may be determined. In particular, the magnetic field sensors 6 are set up to determine the rotor magnetic fields of the magnetic units 105 and to output corresponding measurement signals to the controller 10. With the aid of these measurement signals, a position of the rotors 100 may be determined by the controller 10.

In an embodiment, the connection between the first rotor 101 and the second rotor 102 provided by the coupling device 110 may be released during operation. The stator assemblies 3 or the stator modules 2 are arranged to energize the coil groups 4 based on the control signals in such a way that the connection between the first rotor 101 and the second rotor 102 may be released and re-established.

Figure 2:
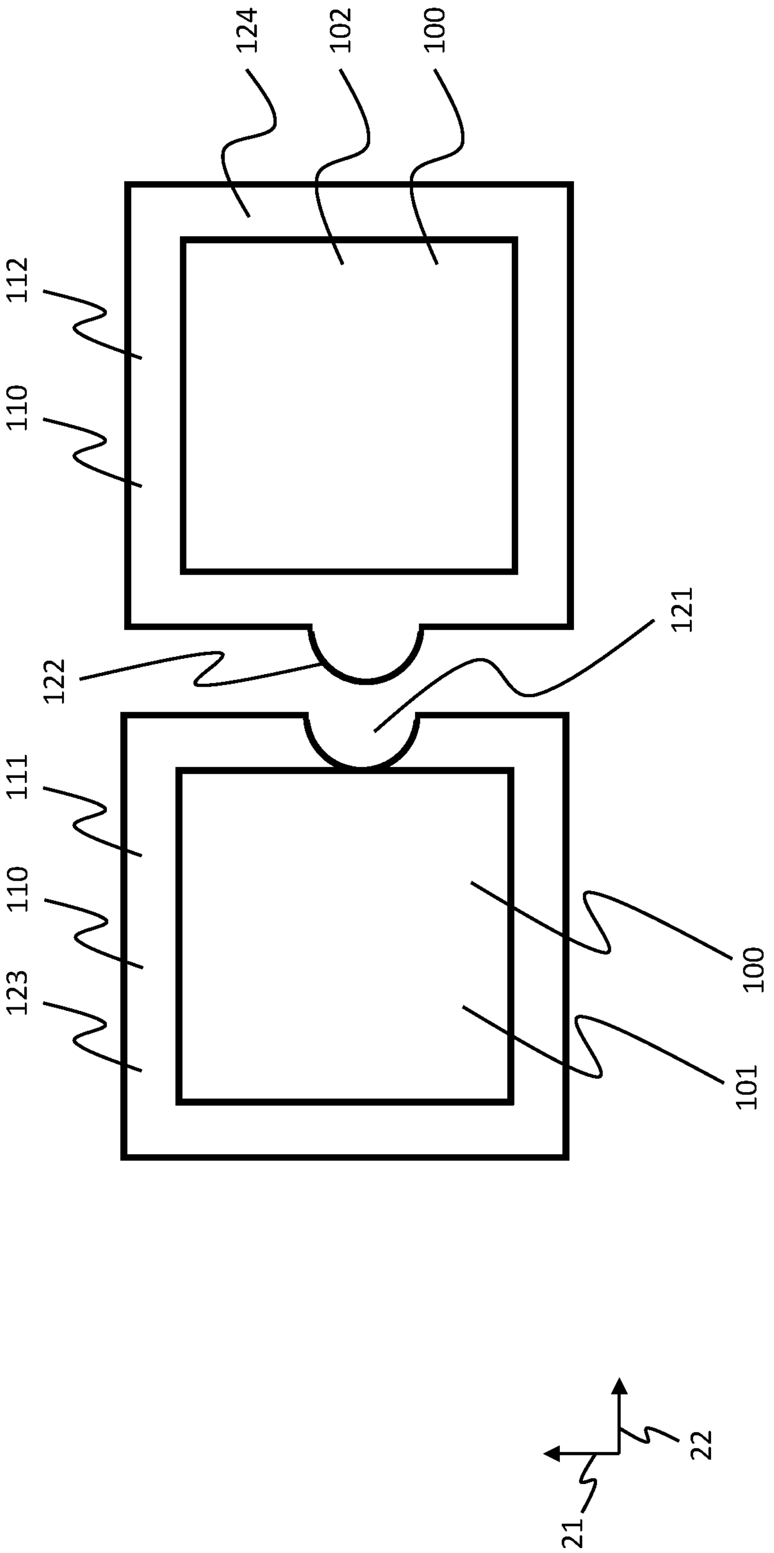
FIG. 2 shows two rotors of a planar drive system having a mechanical coupling device.

FIG. 2 shows a top view of a first rotor 101 and a second rotor 102, in which the coupling device 110 is configured in such a way that the first rotor 101 and the second rotor 102 may be moved in such a way that the connection between the first rotor 101 and the second rotor 102 may be formed and released. In this regard, the first rotor 101 comprises a first coupling element 111 that is part of the coupling device 110. The second rotor 102 comprises a second coupling element 112, which is also part of the coupling device 110. Now, a form-fit connection and/or a mechanical force-fit connection may be formed between the first coupling element 111 and the second coupling element 112. The first coupling element 111 has a recess 121 for this purpose. The second coupling element 112 has a protrusion 122 matching the recess 121. The connection between the first rotor 101 and the second rotor 102 is formed by inserting the protrusion 122 into the recess 121. Furthermore, more than one recess 121 and more than one protrusion 122 may be provided.

In the embodiment example of FIG. 2, both the recess 121 and the protrusion 122 are semicircular. It may be provided in this context that the second rotor 102 is moved towards the first rotor 101 in the second direction 22, thereby inserting the protrusion 122 into the recess 121. Now, the connection between the first rotor 101 and the second rotor 102 is stable at least in the first direction 21 by a form-fit connection and a movement of the first rotor 101 in the first direction 21 automatically also leads to a movement of the second rotor 102 in the first direction 21, provided that no opposite driving magnetic field is embodied below the second rotor 102. In particular, the driving magnetic fields may be embodied in such a way that the first rotor 101 and the second rotor 102 move simultaneously.

The controller 10 shown in FIG. 1 may be operated in a first operation mode and in a second operation mode for the rotors 100 shown in FIG. 2. In the first operation mode, the control signals may be output based on coupling information in such a way that the connection of the first rotor 101 and the second rotor 102 is taken into account. In the second operation mode, based on decoupling information, the control signals are output in such a way that the first rotor 101 and the second rotor 102 are moved individually. Thus, in the first operation mode, the controller 10 assumes that the first rotor 101 and the second rotor 102 are coupled, and outputs the control signals for energizing the coil groups 4 accordingly.

In this case, information on the first operating mode and the second operating mode may e.g. be provided with the aid of magnetic field sensors 6 shown in one of the stator modules 2 in FIG. 1, the magnetic field sensors 6 detecting the magnetic fields of the of the magnet units 105 and thus being able to determine the position of the first rotor 101 and the second rotor 102, respectively. If all stator modules 2 comprise such magnetic field sensors 6 and a dimension of the coupling device 110 is known, conclusions about a coupling or decoupling may be drawn from the position data of the rotors 100. Furthermore, information on whether there is coupling or decoupling of the first rotor 101 and the second rotor 102 may also be stored in a memory arranged on the first rotor 101 or the second rotor 102 and transmitted to the controller 10 with the aid of wireless data communication.

Figure 3:
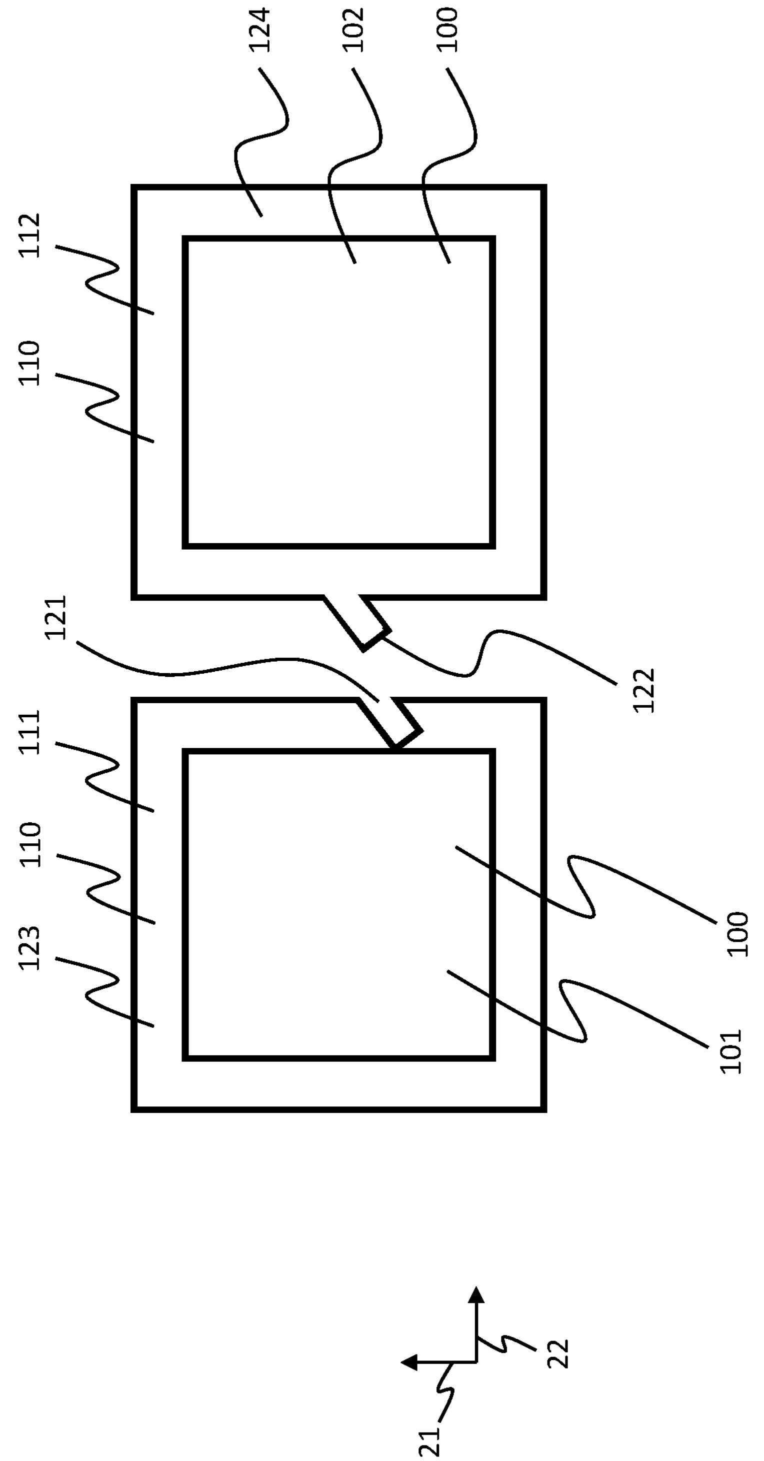
FIG. 3 shows two rotors of a planar drive system having a further mechanical coupling device.

FIG. 3 shows two further rotors 100 comprising a coupling device 110 which is constructed like the coupling device of FIG. 2, unless differences are described below. In FIG. 3, the recess 121 and the protrusion 122 have a different shape and, in particular, are arranged obliquely with regard to the first direction 21 and to the second direction 22, respectively. Thus, in the coupled state, i.e., when the protrusion 122 of the second rotor 102 is inserted into the recess 121 of the first rotor 101, a mechanical connection results which is at least partially form-fitting in both the first direction 21 and the second direction 22 and at least partially mechanically force-fitting, since, on the one hand, a frictional force between the recess 121 and the protrusion 122 and also the shape of the recess 121 and the protrusion 122 may be used to transmit force from the first rotor 101 to the second rotor 102. The connection between the first rotor 101 and the second rotor 102 may only be released again by a movement parallel to the protrusion 122.

Figure 4:
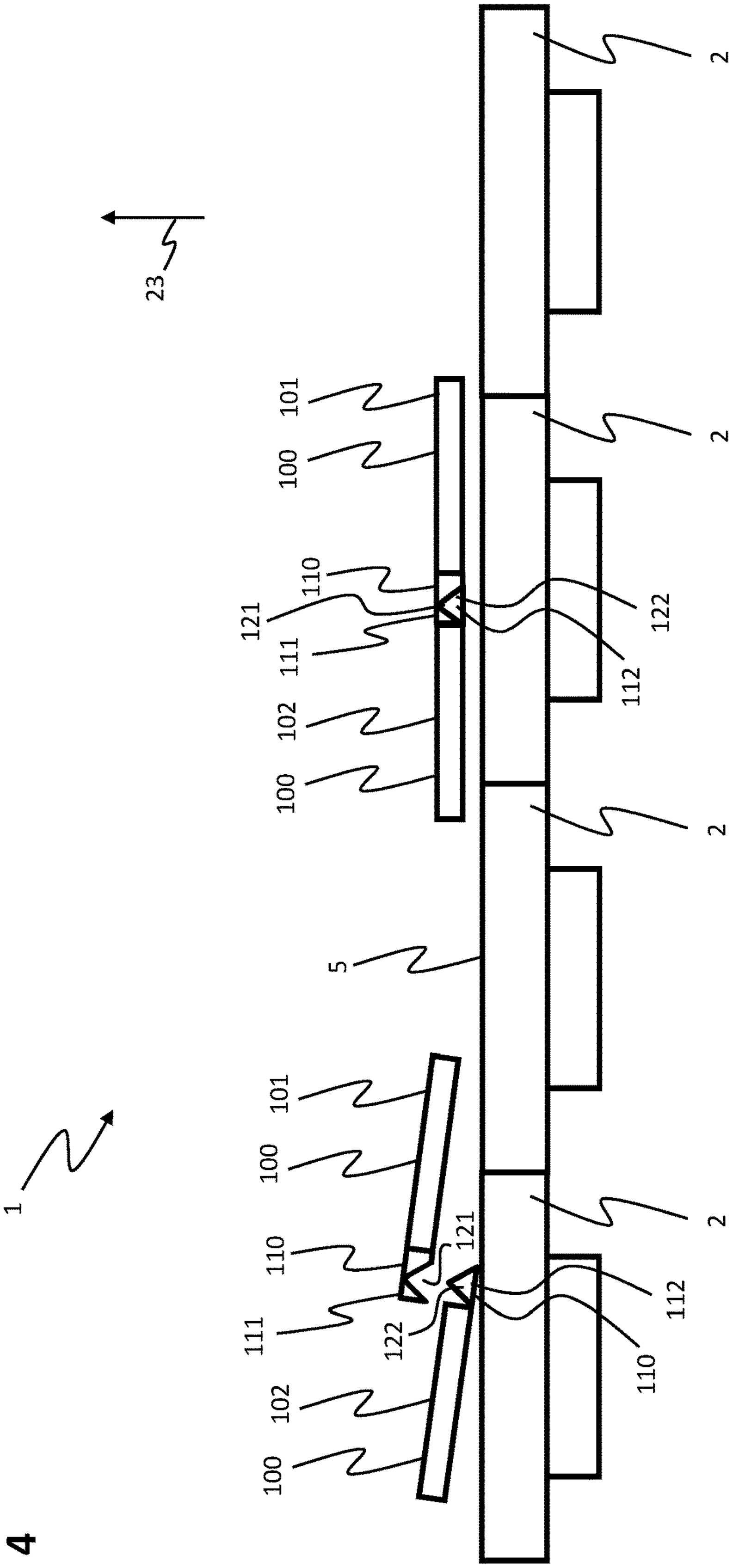
FIG. 4 shows a side view of a planar drive system comprising rotors with mechanical coupling devices.

FIG. 4 shows a side view of a planar drive system 1 having two first rotors 101 and two second rotors 102. In the left area of the depiction of FIG. 4, a first rotor 101 and a second rotor 102 are shown in an uncoupled state or in a state shortly prior to coupling. The coupling device 110 again comprises a first coupling element 111 of the first rotor 101 and a second coupling element 112 of the second rotor 102. The first coupling element 111 again comprises a recess 121, and the second coupling element 112 comprises a protrusion 122. The recess 121 and the protrusion 122 are in this context arranged in such a way that insertion of the protrusion 122 into the recess 121 is not possible when the first rotor 101 and the second rotor 102 are in parallel to the stator surface 5. However, if the first rotor 101 and/or the second rotor 102 are tilted from a position parallel to the stator surface 5, the first rotor 101 and the second rotor 102 may subsequently be moved towards each other in such a way that the protrusion 122 is arranged below the recess 121 and bringing the first rotor 101 and/or the second rotor 102 into a resting position parallel to the stator surface 5 leads to an insertion of the protrusion 122 into the recess 121. This condition is shown for the two rotors 100 depicted on the right of FIG. 4.

In the coupling mechanism of FIG. 4, both the first rotor 101 and the second rotor 102 are tilted from the resting position. However, it may also be provided that only the first rotor 101 or only the second rotor 102 are to be tilted from the resting position to form or release the connection. If the connection is formed with the aid of the coupling device 110, as is the case for the two rotors 100 depicted on the right of FIG. 4, the first rotor 101 and the second rotor 102 may be moved simultaneously in parallel to the stator surface 5 without the movement of either of the two rotors 100 causing the connection to be released again. Furthermore, driving forces for the first rotor 101 and for the second rotor 102 may be combined.

In FIG. 4, the recess 121 and the protrusion 122 are shown with a triangular cross-section. However, other cross-sections for the recess 121 and the protrusion 122 are conceivable, as well. In order to establish or to release the connection between the first rotor 101 and the second rotor 102 in the planar drive system 1 of FIG. 4, the first rotor 101 and the second rotor 102 are tilted in opposite directions with regard to each other. This means that in the region of the coupling device 110, i.e. in particular in the region of the first coupling element 111 and the second coupling element 112, the first rotor 101 is moved away from the stator surface 5 with respect to a third direction 23 perpendicular to the stator surface 5 and the second rotor 102 is moved towards the stator surface 5 in the region of the second coupling element 112 with respect to the third direction 23.

Figure 5:
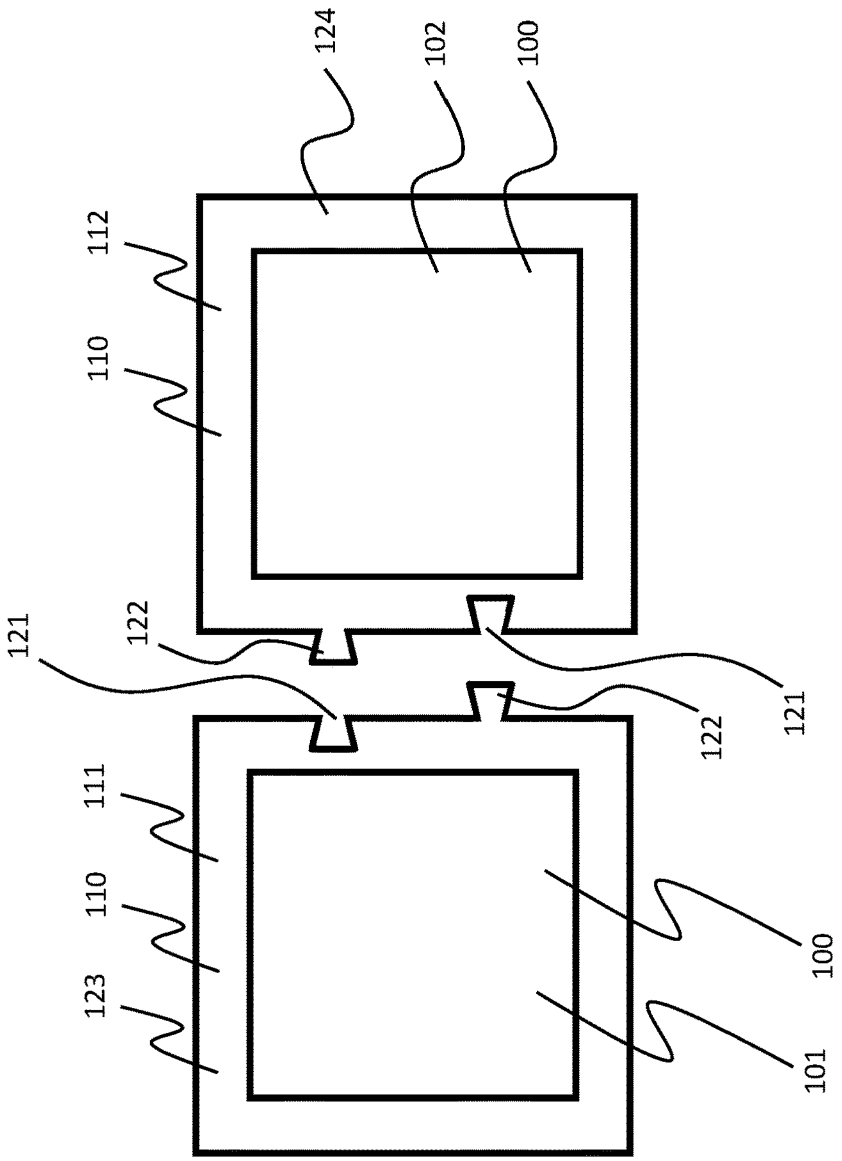
FIG. 5 shows two rotors of a planar drive system having a further mechanical coupling device.

FIG. 5 shows a top view of two further rotors 100 corresponding to the rotors 100 of FIGS. 2 to 3, unless differences are described below. In this case, the first coupling element 111 comprises both a recess 121 and a protrusion 122. The second coupling element 112 also comprises a recess 121 and a protrusion 122. In this case, the recess 121 of the first coupling element 111 matches the protrusion 122 of the second coupling element 112. The recess 121 of the second coupling element 112 matches the protrusion 122 of the first coupling element 111. Both the recesses 121 and the protrusions 122 are dovetailed in this case, so that a mechanism analogous to FIG. 4 may be selected to couple the first rotor 101 and the second rotor 102 by tilting the rotors 100 in opposite directions and then moving them towards each other, and then by bringing them back into the horizontal position, the recesses 121 receive the protrusions 122. Alternatively, in the embodiments of FIGS. 4 and 5, it may also be provided to move the first rotor 101 and the second rotor 102 in different planes with respect to the third direction 23 before forming the connection.

The coupling devices 110 described in connection with FIGS. 2 to 5 may be part of a circumferential area running around the rotors 100. FIGS. 2 to 5 also each show only one connection option to a further rotor 100, but it may also be provided that recesses 121 or protrusions 122 are arranged circumferentially around the rotors 100 in order to mechanically connect further rotors after the connection between the first rotor 101 and the second rotor 102 has been established. Furthermore, a connection between the first rotor 101 and the second rotor 102 may also be released and then the first rotor 101 or the second rotor 102 may be connected to a further rotor. The connections may be formed in either the first direction 21 or the second direction 22. The mechanically connected rotors 100 may thereby provide, in particular, a planar drive system 1 with an increased load-bearing capacity, since the load-bearing capacity of magnetic units 105 of a plurality of rotors 100 may be used in total.

In this regard, the embodiments of FIGS. 2, 3, and 5 show that the first coupling element 111 optionally integrates with a first circumferential edge element 123 of the first rotor 101, and the second coupling element 112 optionally integrates with a second circumferential edge element 124 of the second rotor 102.

Figure 6:
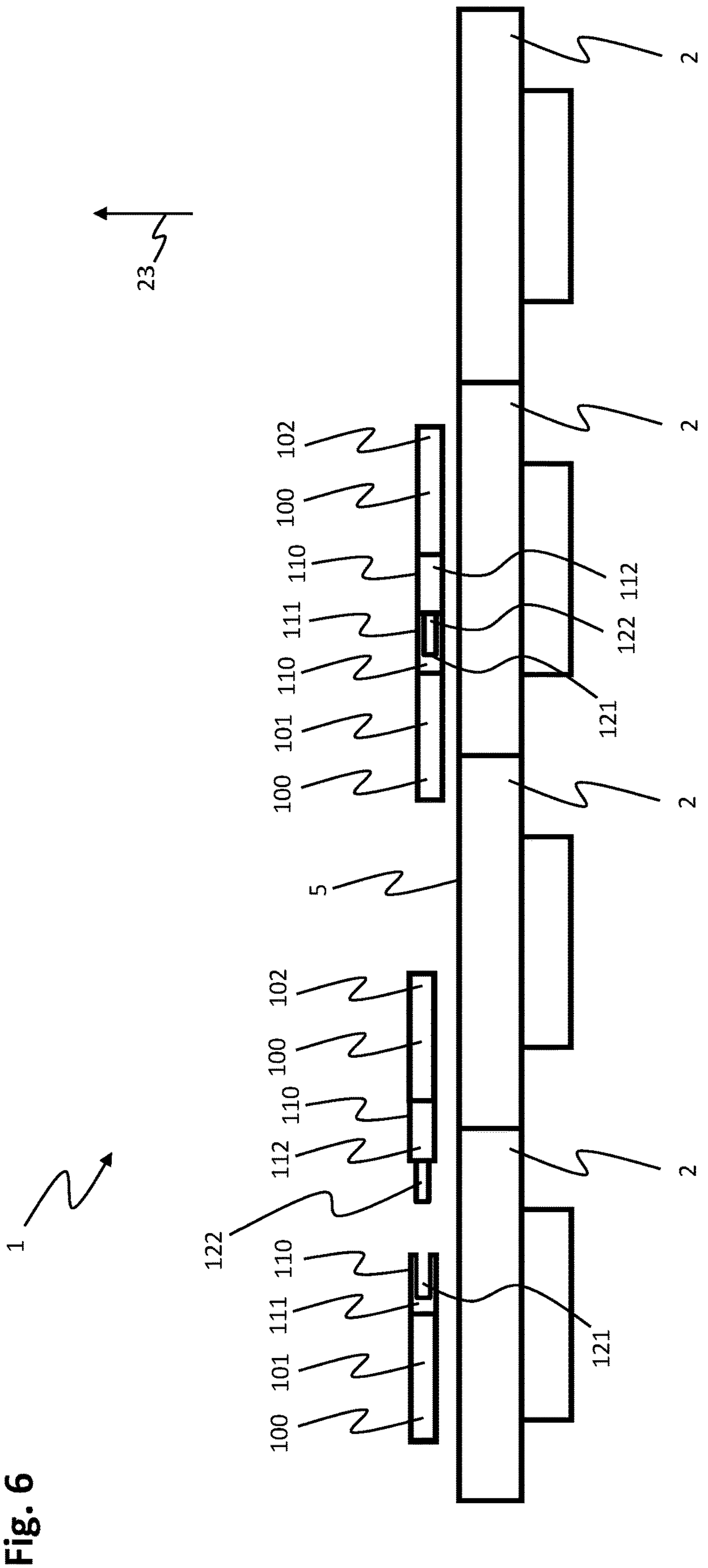
FIG. 6 shows a side view of a planar drive system having two rotors with a further mechanical coupling device.

FIG. 6 shows a side view of a planar drive system 1, in which a first rotor 101 may also be connected to a second rotor 102. In the left section of the depiction of FIG. 6, the first rotor 101 and the second rotor 102 are separated from each other. The coupling device 110 again comprises a first coupling element 111 of the first rotor 101 and a second coupling element 112 of the second rotor 102, the first coupling element 111 again comprising a recess 121 and the second coupling element 112 again comprising a protrusion 122. In this context, the recess 121 is a dowel pin bore and the protrusion 122 is a dowel pin. The protrusion 122 may again be inserted in into the recess 121 parallel and then results into the connection between the first rotor 101 and the second rotor 102 shown on the right of FIG. 6. As a result, the first rotor 101 and the second rotor 102 are connected to each other, in particular in the third direction 23.

Figure 7:
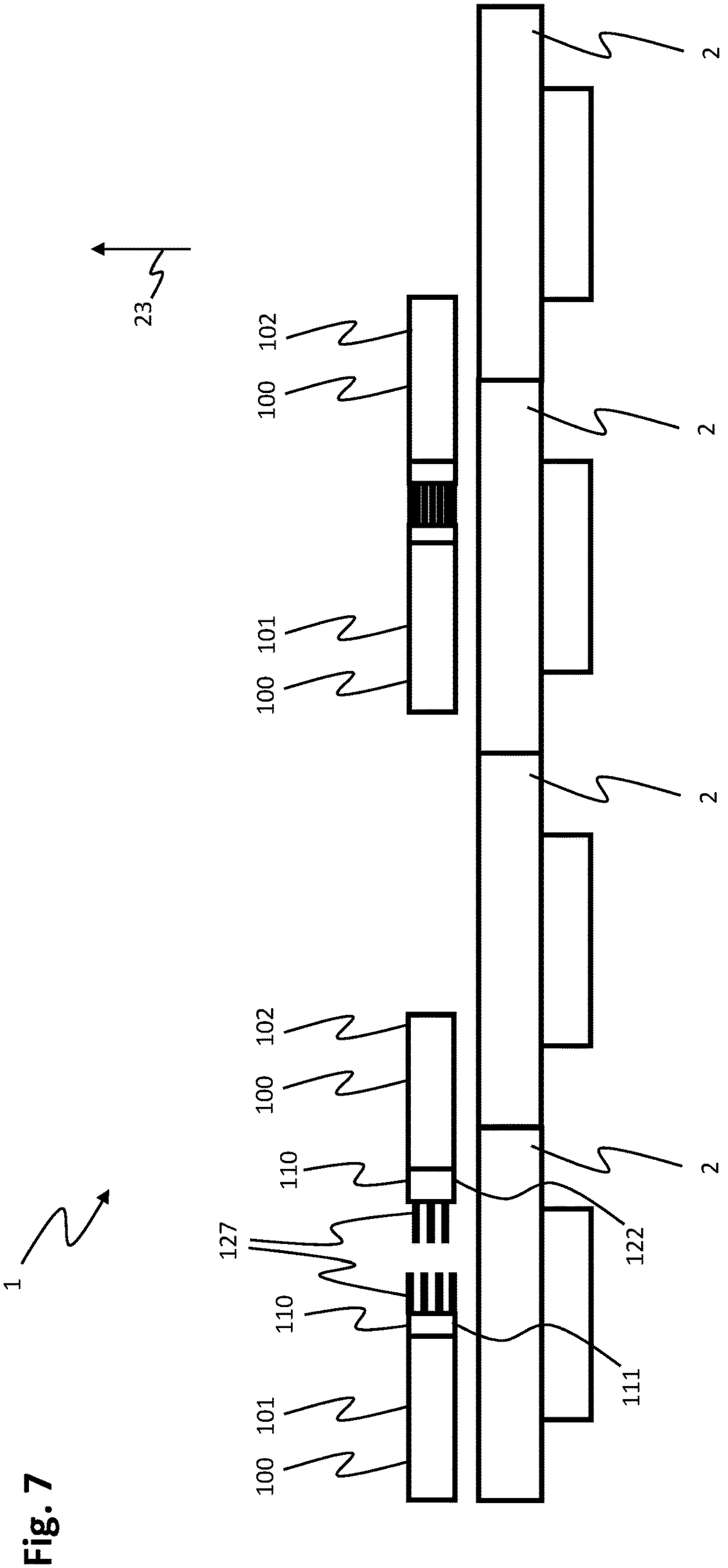
FIG. 7 shows a side view of a planar drive system having rotors with a further mechanical coupling device.

FIG. 7 shows a side view of a planar drive system 1 in which the first coupling element 111 and the second coupling element 112 comprise a comb structure 127 that matches each other, wherein the comb structure 127 may again be formed by dowel pins or by flat platelets. Again, a stable connection of the first rotor 101 and the second rotor 102 may be established in the third direction 23.

In the embodiment examples of FIGS. 4, 6 and 7, it is shown that the first coupling element 111 and the second coupling element 112 are not part of a respective circumferential edge element of the respective rotor 100. However, this may of course also be provided for the respective two rotors 100 of the embodiments of FIGS. 4, 6 and 7 in this way, as shown for example in FIGS. 2, 3 and 5.

Figure 8:
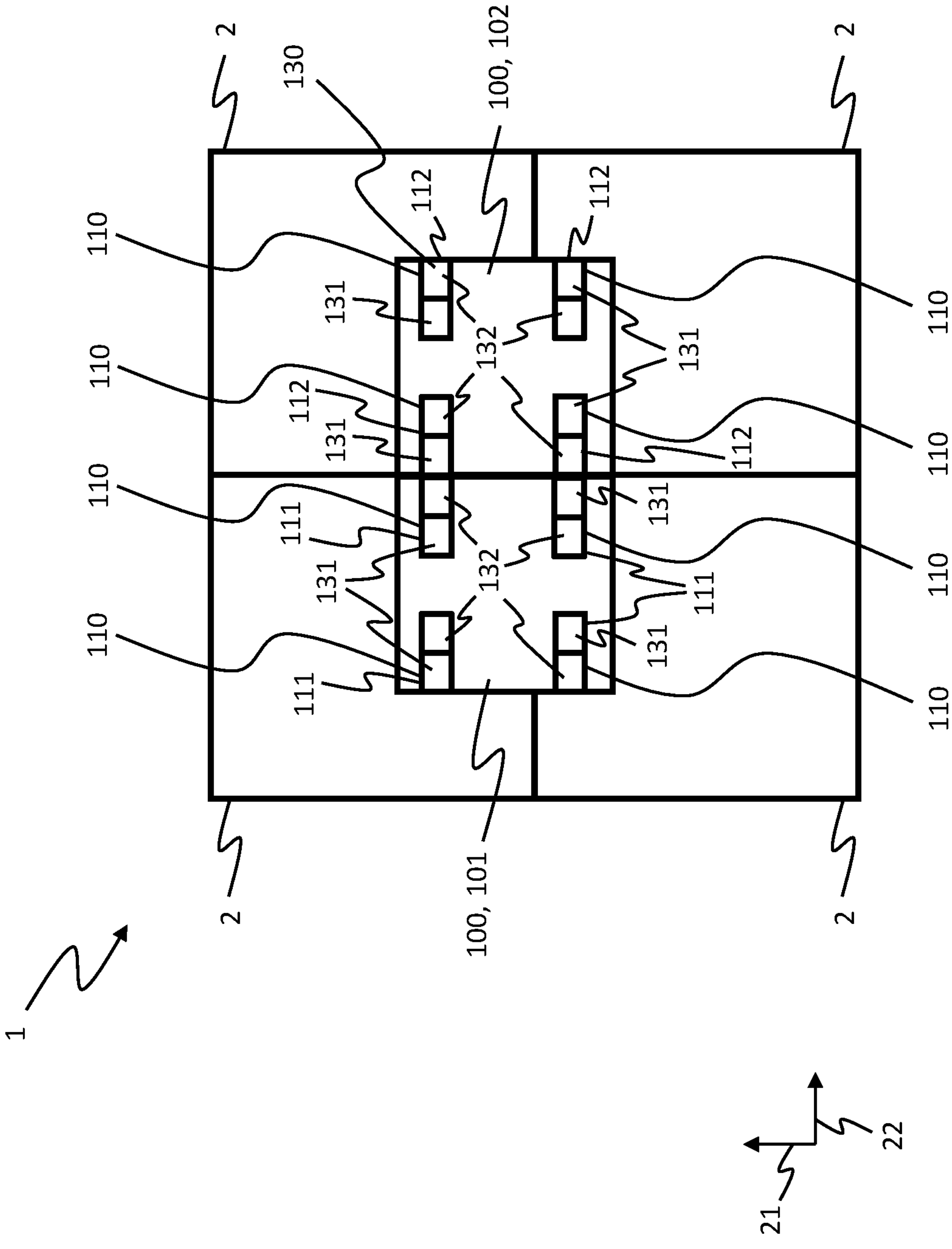
FIG. 8 shows a top view of a planar drive system having rotors with a magnetic coupling device.

FIG. 8 shows a top view of a planar drive system 1 in which a first rotor 101 and a second rotor 102 are coupled to each other. In this case, the first coupling element 111 and the second coupling element 112 comprise magnets 130. The first coupling element 111 of the first rotor 101 comprises four magnets 130, as does the second coupling element 112 of the second rotor 102. The magnets 130 each have a north pole 131 and a south pole 132. The magnets 130 are arranged on the rotors 100 in such a way that the north poles 131 and the south poles 132 of the coupling device 110, respectively, are also adjacent to each other when the rotors 100 are adjacent to each other, and thus a magnetic force and thus a magnetic force-fit connection may be established between the first rotor 101 and the second rotor 102.

In FIG. 8, the magnets 130 are in this context arranged only in such a way that a connection is formed in the second direction 22. In the second direction 22, the rotors 100 each comprise two magnets 130 in edge regions facing the other rotor 100. However, magnets pointing in the first direction 21 may also be provided as an addition or as an alternative. It may also be possible to switch the magnets 130, for example in an embodiment as electromagnets. Alternatively, the magnets 130 may comprise a permanent magnet and an electromagnet, wherein a magnetic field of the permanent magnet may be cancelled with the aid of the electromagnet and thus the magnet 130 may be "switched off".

In an embodiment, the magnets 130 of the first coupling element 111 and/or the second coupling element 112 are supported in a rotatable manner. If the magnets 130 are supported in a rotatable manner, a system may be provided in which, by moving the first rotor 101 and the second rotor 102 relative to each other in such a way that the magnets 130 of the first rotor 101 come into the sphere of influence of the magnets 130 of the second rotor 102 and, due to the rotatability, align themselves in a sensing manner in such a way that a magnetic force-fit connection is provided between the first rotor 101 and the second rotor 102. Such a system is particularly flexible in use.

Overall, it may be provided that, if the force of one pair of magnets 130 is not sufficient or the force of two pairs of magnets 130 (as shown in FIG. 8) is not sufficient, the number of magnets 130 on the rotors 100 is increased. Contrary to the depiction of FIG. 8, the magnets 130 may also again be integrated into the first edge element 123 or into the second edge element 124 of the rotors 100.

The magnets 130 of the embodiment example of FIG. 8 may be provided in addition to the mechanical connection options of the rotors 100 of FIGS. 2 to 7. If both mechanical and magnetic connections are provided, a particularly stable arrangement of the first rotor 101 and the second rotor 102 may be provided as a result.

Figure 9:
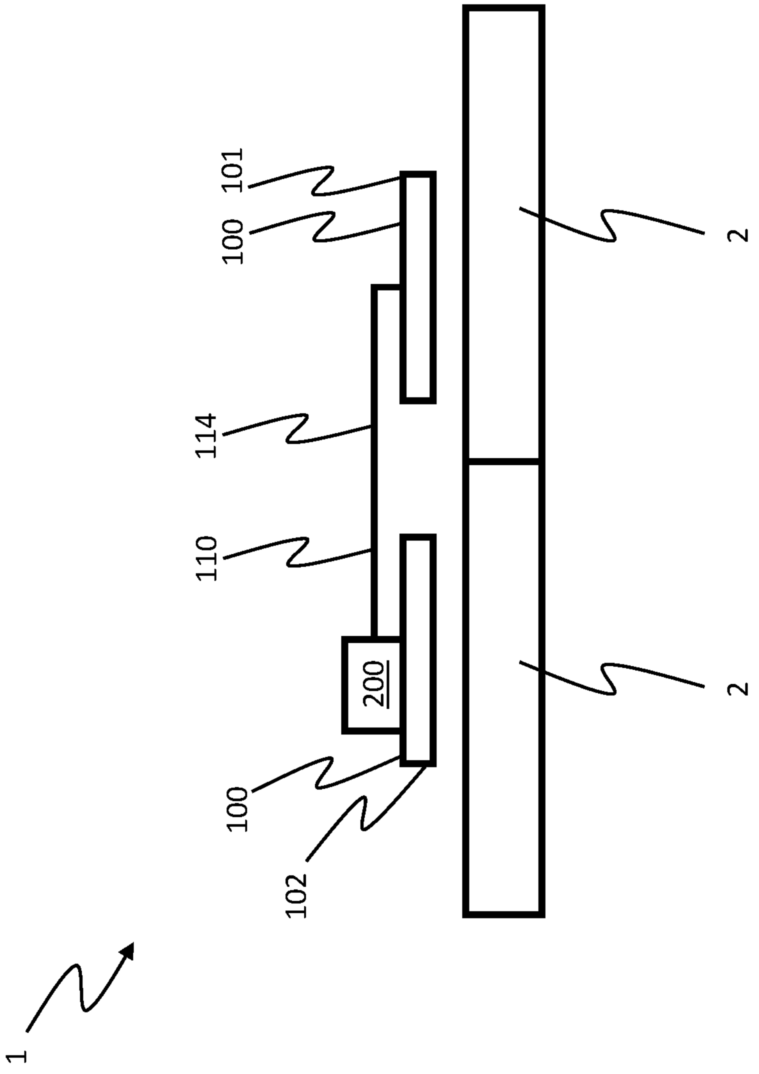
FIG. 9 shows a side view of a planar drive system.

FIG. 9 shows a side view of a planar drive system 1, in which a connection between a first rotor 101 and a second rotor 102 is also provided with the aid of a coupling device 110. In this case, the coupling device 110 is configured as a push rod 114 and is arranged to move an element 200, which is located on the second rotor 102, on the second rotor 102 by a movement of the first rotor 101, wherein the push rod 114 is connected to the first rotor 101. The movement of the element 200 may thereby include moving it above the second rotor 102, or it may include moving it down from the second rotor 102. The element 200 may e.g. be a product transported by the planar drive system 1.

Figure 10:
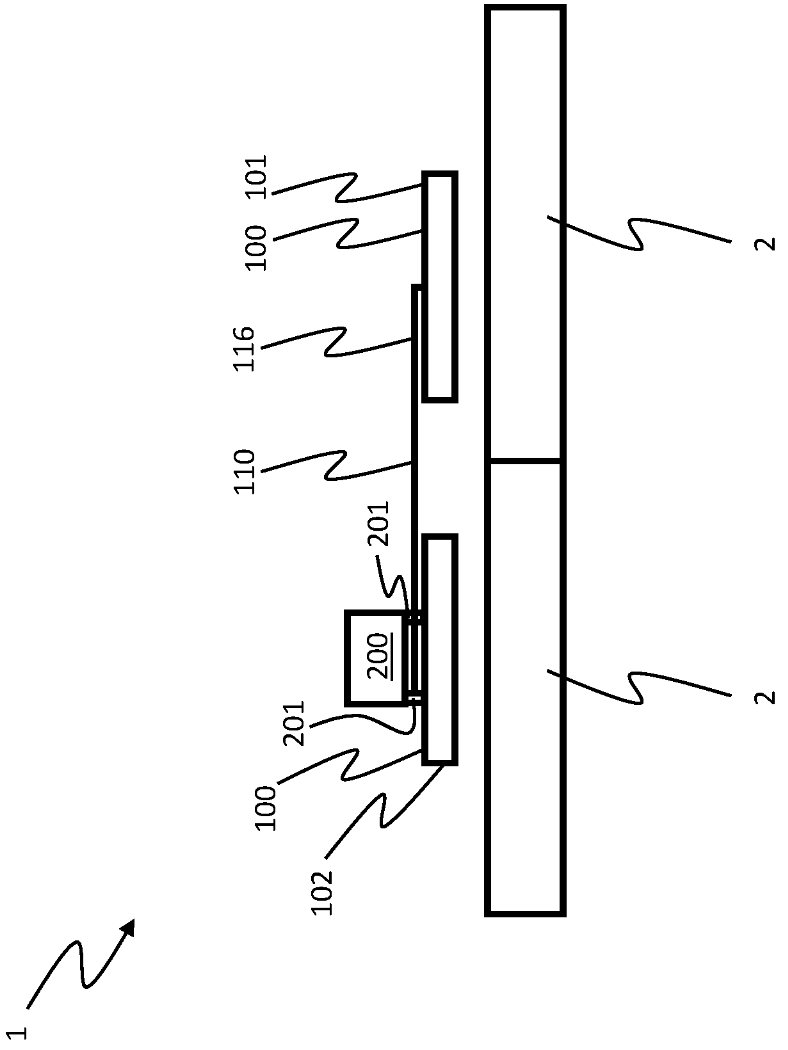
FIG. 10 shows a side view of a planar drive system.

FIG. 10 shows a side view of a planar drive system 1, in which the coupling device 110 is configured as a lifting device 116. The element 200 arranged on the second rotor 102, which is arranged on element protrusions 201, may be lifted by the lifting device 116, which is connected to the first rotor 101. In order to do so, the lifting device 116 is moved below the element 200 and then the first rotor 101 is raised and/or the second rotor 102 is lowered. At the moment the lifting device 116 contacts the element 200, a connection is established between the first rotor 101 and the second rotor 102, and the first rotor 101 and the second rotor 102 are moved relative to each other in a coordinated manner. The element 200 may again be a transported product.

Figure 11:
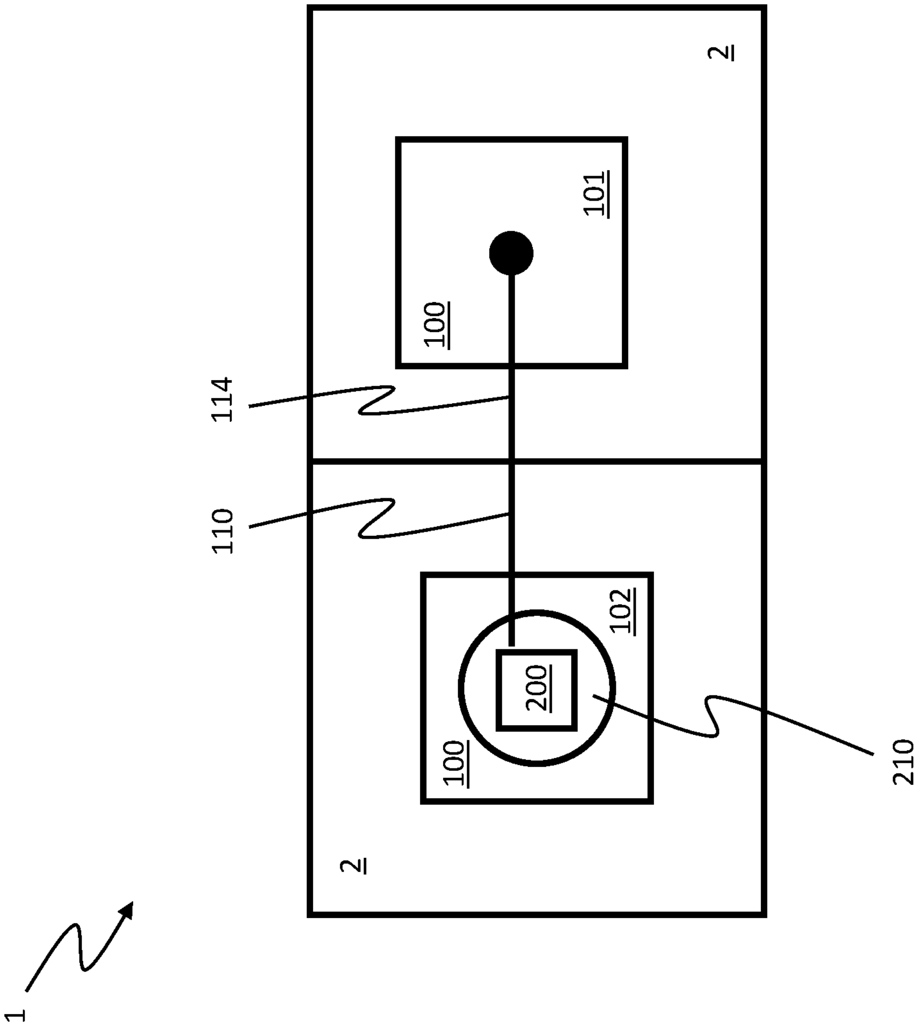
FIG. 11 shows a top view of a planar drive system.

FIG. 11 shows a top view of a planar drive system 1, in which a coupling device 110 is again configured as a push rod 114 and is connected to a first rotor 101. An element 200, which may again be a product, is arranged on a second rotor 102, the element 200 being arranged on a turntable 210. With the aid of the push rod 114, the element 200 may be rotated on the second rotor 102 with the aid of the turntable 210. At the moment when the push rod 114 contacts the element 200, the connection between the first rotor 101 and the second rotor 102 is again established and a coordinated movement of the first rotor 101 and the second rotor 102 relative to each other takes place. Furthermore, it may be provided that the turntable 210 includes a protrusion to which the push rod 114 may be attached. This allows for the element 200 being rotated without being contacted by the push rod 114.

Figure 12:
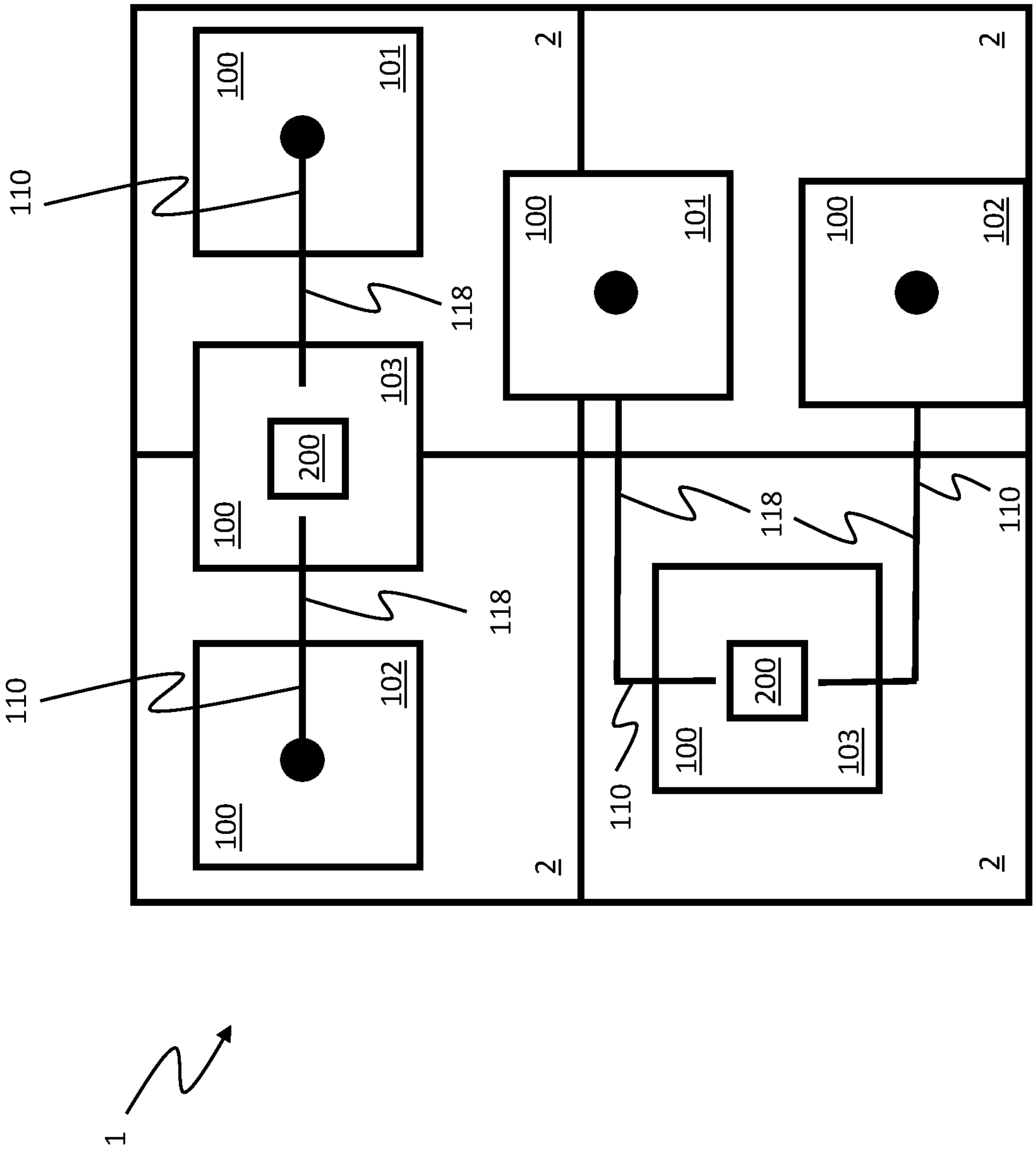
FIG. 12 shows a top view of a planar drive system.

FIG. 12 shows a top view of a planar drive system 1, in which a first rotor 101 is also connected to a second rotor 102 and the first rotor 101 and the second rotor 102 are moved in a coordinated manner. An element 200, which may again be a product moved by the planar drive system 1, is arranged on a third rotor 103. The first rotor 101 and the second rotor 102 each comprise a clamping rod 118, with the aid of which the element 200 may be clamped. After clamping, the third rotor 103 may be moved away and the element 200 may then be held by the first rotor 101 and the second rotor 102 and transferred, for example, to a further processing station or to a further rotor. In FIG. 12, a plurality of such systems of first rotor 101, second rotor 102 and third rotor 103 are shown, differing in the shape of the clamping bar 118. In the upper depiction, the clamping rod 118 is straight in each case, and in the lower illustration, it is angled in each case.

Figure 13:
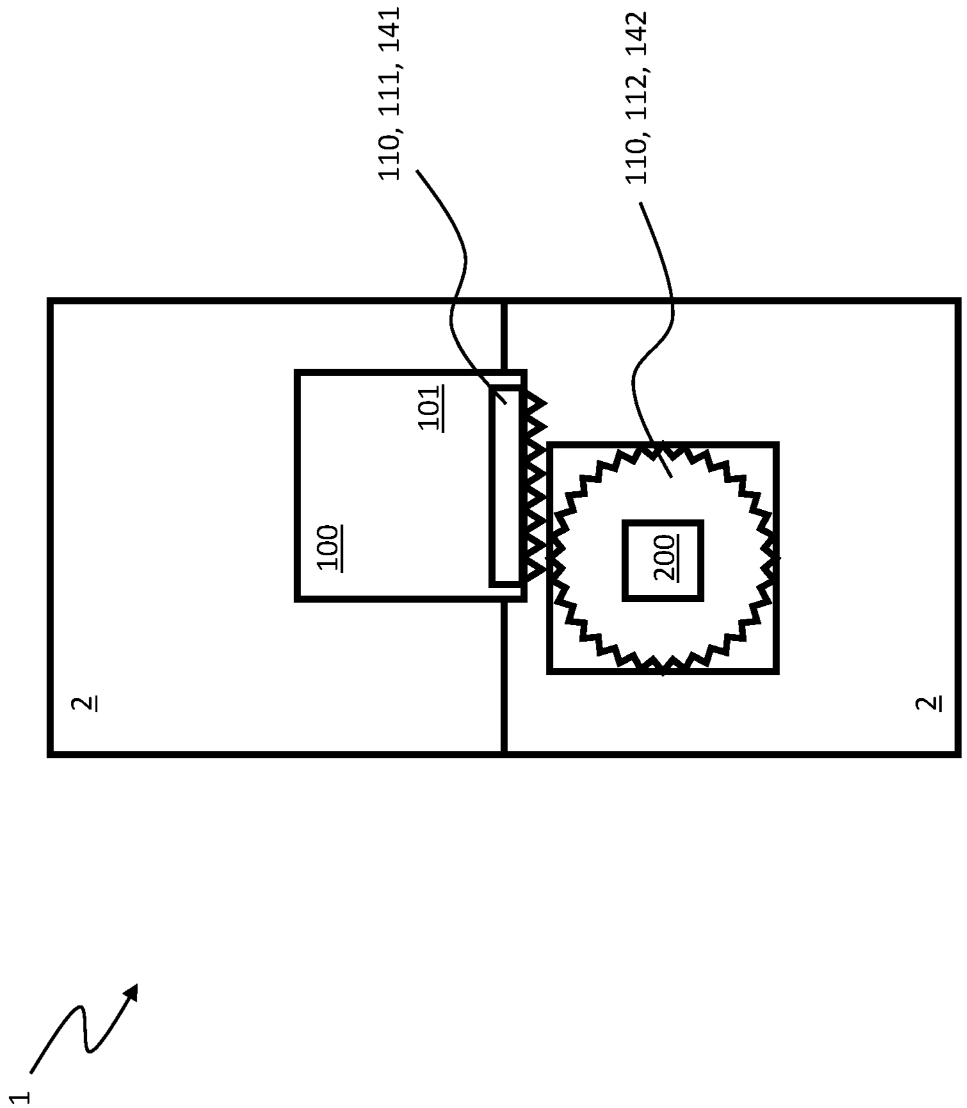
FIG. 13 shows a top view of a planar drive system.

FIG. 13 shows a top view of a planar drive system 1, in which the first coupling element 111 of the coupling device 110 of the first rotor 101 is embodied as a toothed rack 141. The second coupling element 112 of the coupling device 110 of the second rotor 102 is configured as a gear disk 142. An element 200 is arranged on the gear disk 142. If the first rotor 101 is moved along the second rotor 102 in a coordinated manner in such a way that the rack 141 engages with the gear disk 142, this movement may be used to rotate the rotatably mounted gear disk 142 on the second rotor 102 and thus also to rotate the element 200. Again, this requires a coordinated movement of the first rotor 101 and the second rotor 102 with respect to each other. The first rotor 101 and the second rotor 102 are again connected with the aid of the coupling device 110. Furthermore, with the aid of a rotation of the second rotor 102 with the gear disk 142, a linear motion of an element on the first rotor 101 transmitted to the rack 141 may also be generated. Again, this requires the first rotor 101 and the second rotor 102 to move in a coordinated manner with regard to each other. The first rotor 101 and the second rotor 102 are again connected with the aid of the coupling device 110.

Figure 14:
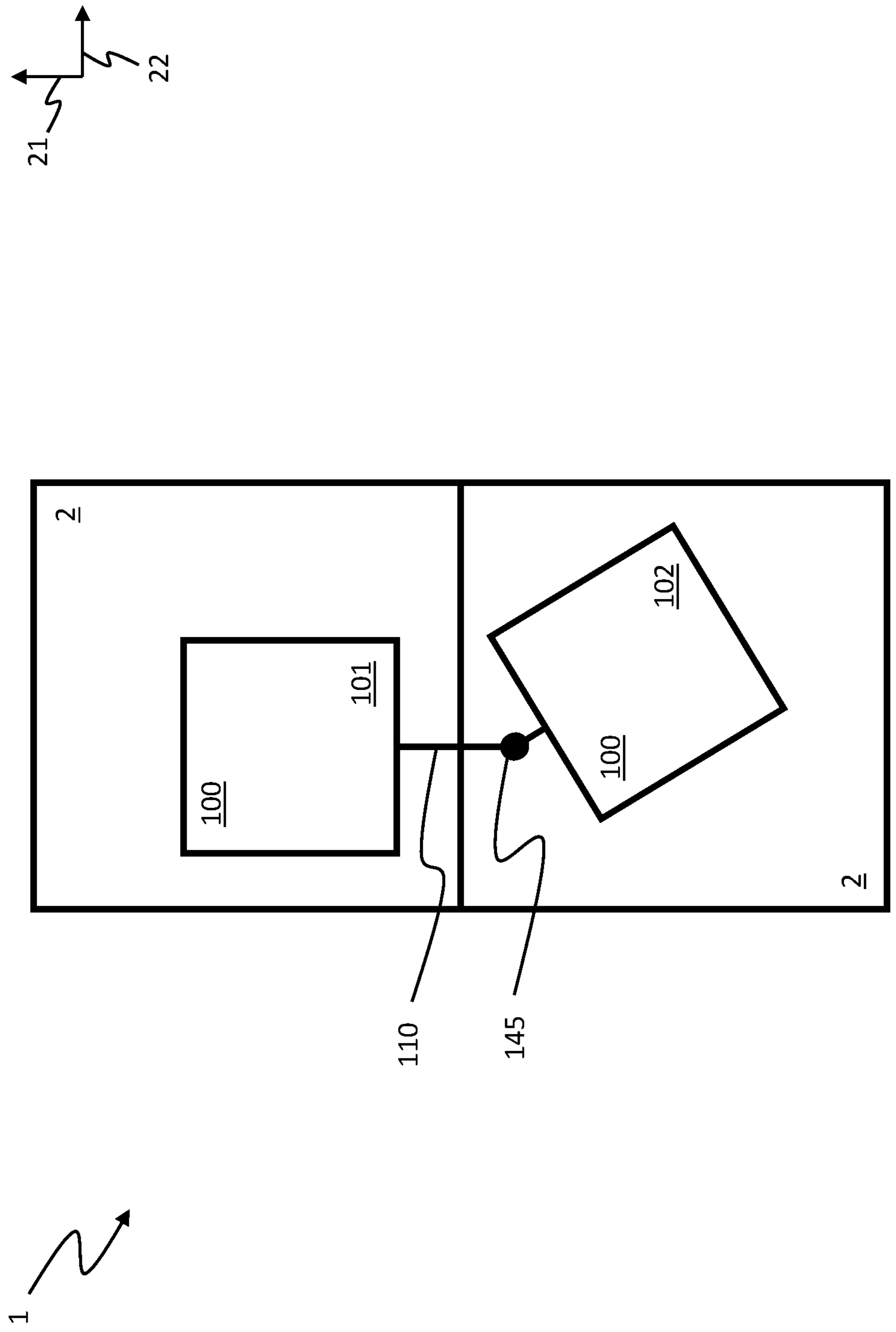
FIG. 14 shows a top view of a planar drive system.

FIG. 14 shows a planar drive system 1 in which the coupling device 110 is embodied as a coupling 145. The first rotor 101 and the second rotor 102 are connected to each other via the coupling 145. By moving the first rotor 101 exclusively in the first direction 21 and/or in the second direction 22, the second rotor 102 may be rotated by any rotational angle. In this regard, it may be provided that the coupling 145 is embodied to be fixed or detachable.

Figure 15:
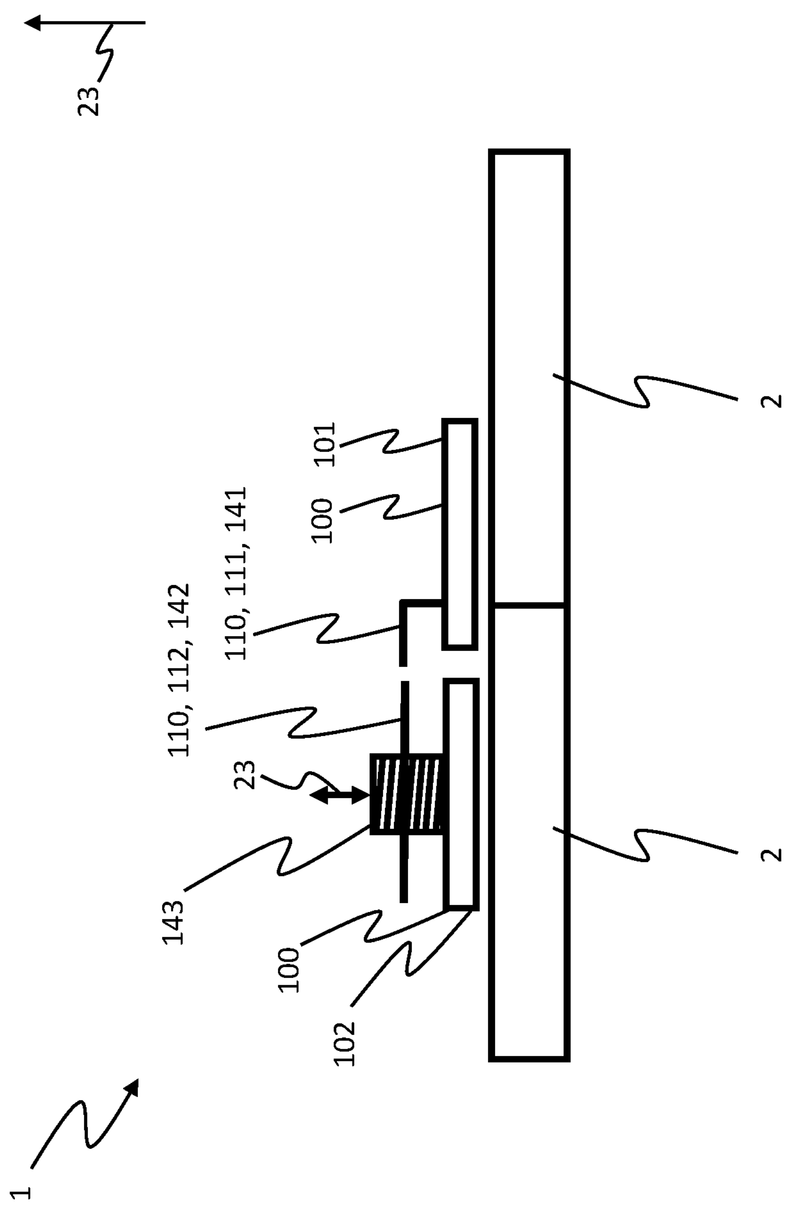
FIG. 15 shows a side view of a planar drive system.

FIG. 15 shows a side view of a planar drive system 1, in which the coupling device 110 again comprises a first coupling element 111 with a toothed rack 141 and a second coupling element 112 with a gear disk 142. In this case, the gear disk 142 comprises an internal thread with the aid of which a threaded rod 143 may be moved upwards or downwards, i.e. in the third direction 23. This may be used, for example, when the second rotor 102 is placed on the stator modules 2 in order to subsequently generate large lifting forces, for example for stamping, pressing or clamping, with the aid of the threaded rod 143. Again, a connection between the first rotor 101 and the second rotor 102 may be established by bringing the rack 141 into connection with the gear disk 142. Furthermore, the first rotor 101 with the rack 141 may also be guided to the gear disk 142 multiple times to increase a stroke of the threaded rod 143.

Figure 16:
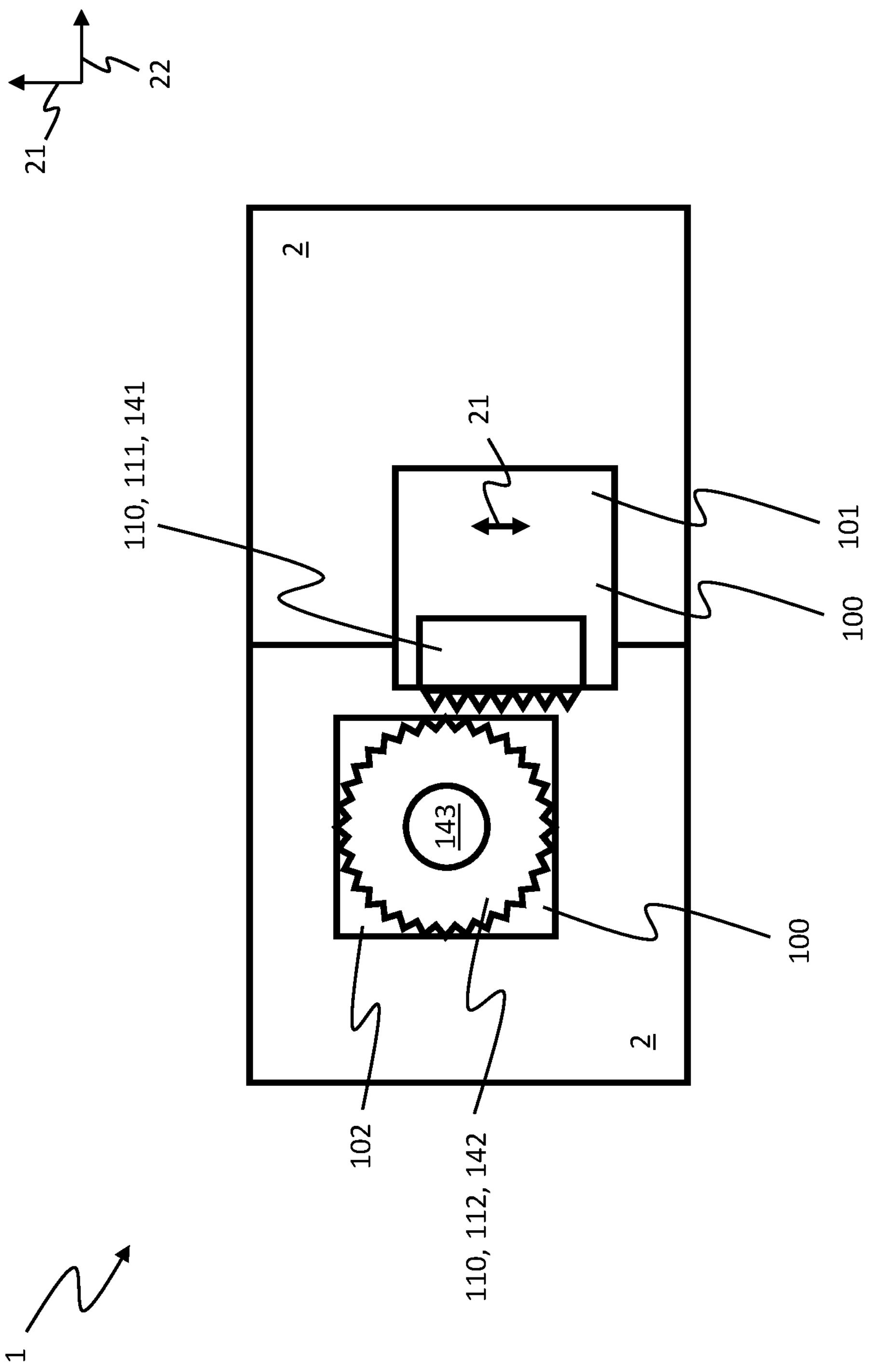
FIG. 16 shows a top view of a planar drive system.

FIG. 16 shows a top view of the planar drive system 1 of FIG. 15. When the first rotor 101 is moved in the first direction 21, the movement on the threaded rod 143 is converted into a movement in the third direction 23 via the rack 141 and the gear disk 142.

Figure 17:
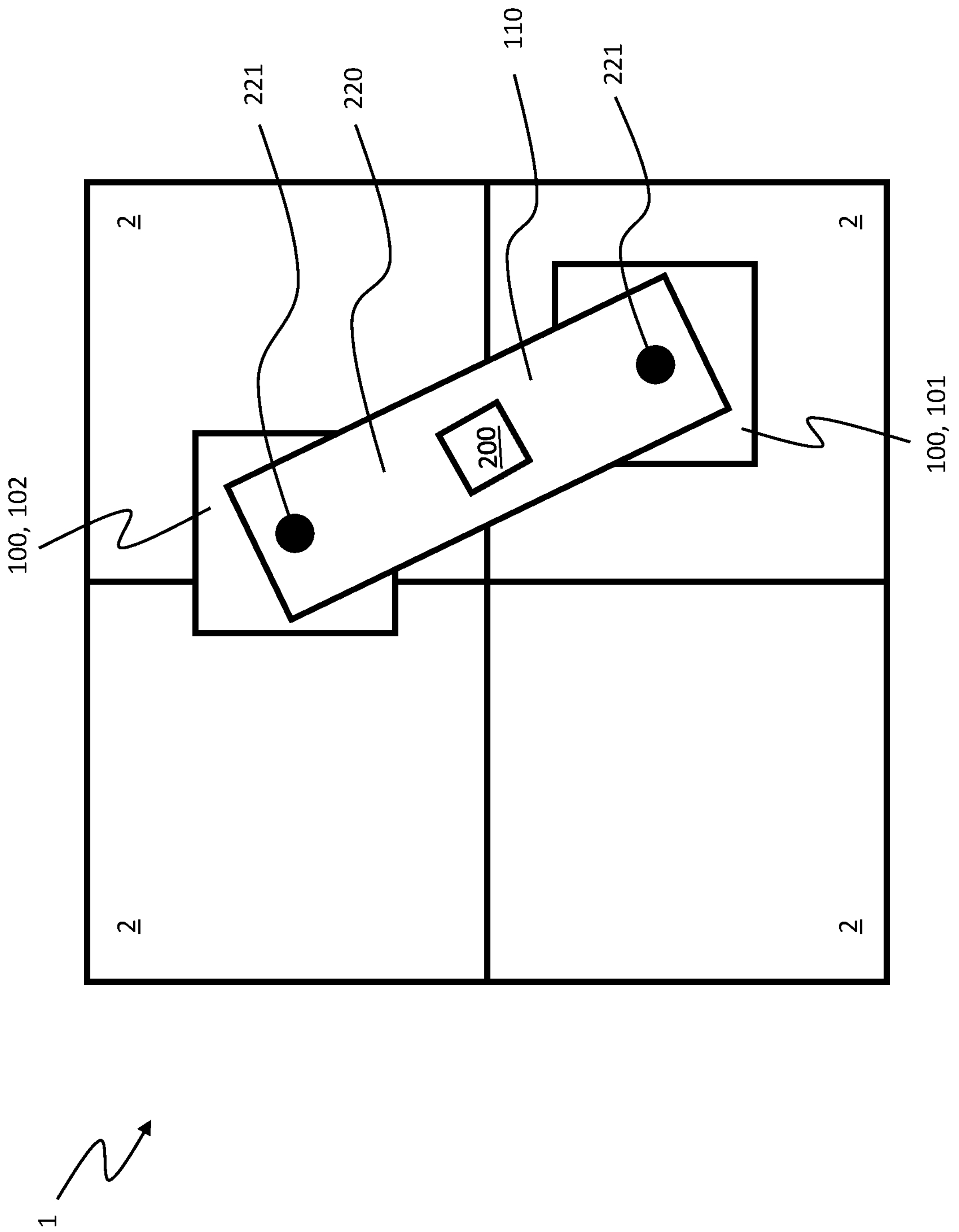
FIG. 17 shows a top view of a planar drive system.

FIG. 17 shows a top view of a planar drive system 1, in which the coupling device 110 between the first rotor 101 and the second rotor 102 is formed as a plate 220, which is rectangular in shape here. The plate 220 is connected to the first rotor 101 and the second rotor 102, respectively, with the aid of pivot bearings 221. An element 200 arranged on the plate 220 may be brought into any rotational position by a movement of the first rotor 101 and the second rotor 102 relative to each other.

Figure 18:
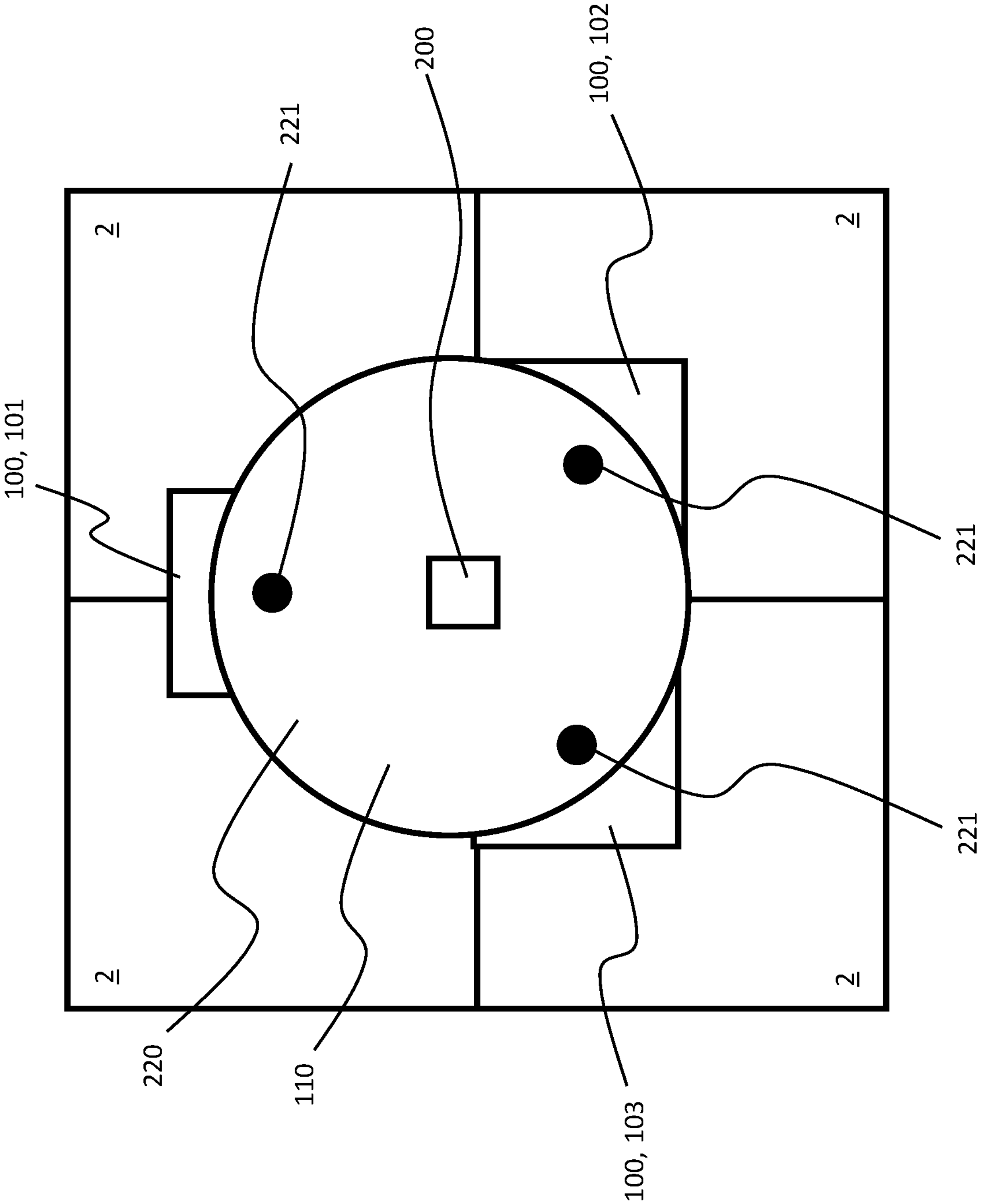
FIG. 18 shows a top view of a planar drive system.

FIG. 18 shows a top view of a planar drive system 1 corresponding to the planar drive system 1 of FIG. 17, unless differences are described below. In this case, the plate 220 is round in shape and is further connected to a third rotor 103 also via a pivot bearing 221. This also allows for the rotation of the element 200 at any angle of rotation. Similarly, more than two or three rotors 100 may be provided in the embodiment examples of FIGS. 17 and 18. The larger the number of rotors 100 used, the heavier the element 200 may be.

The element 200 on the plate 220 of the planar drive systems 1 of FIGS. 17 and 18 may again be a product moved by the planar drive system 1.

Figure 19:
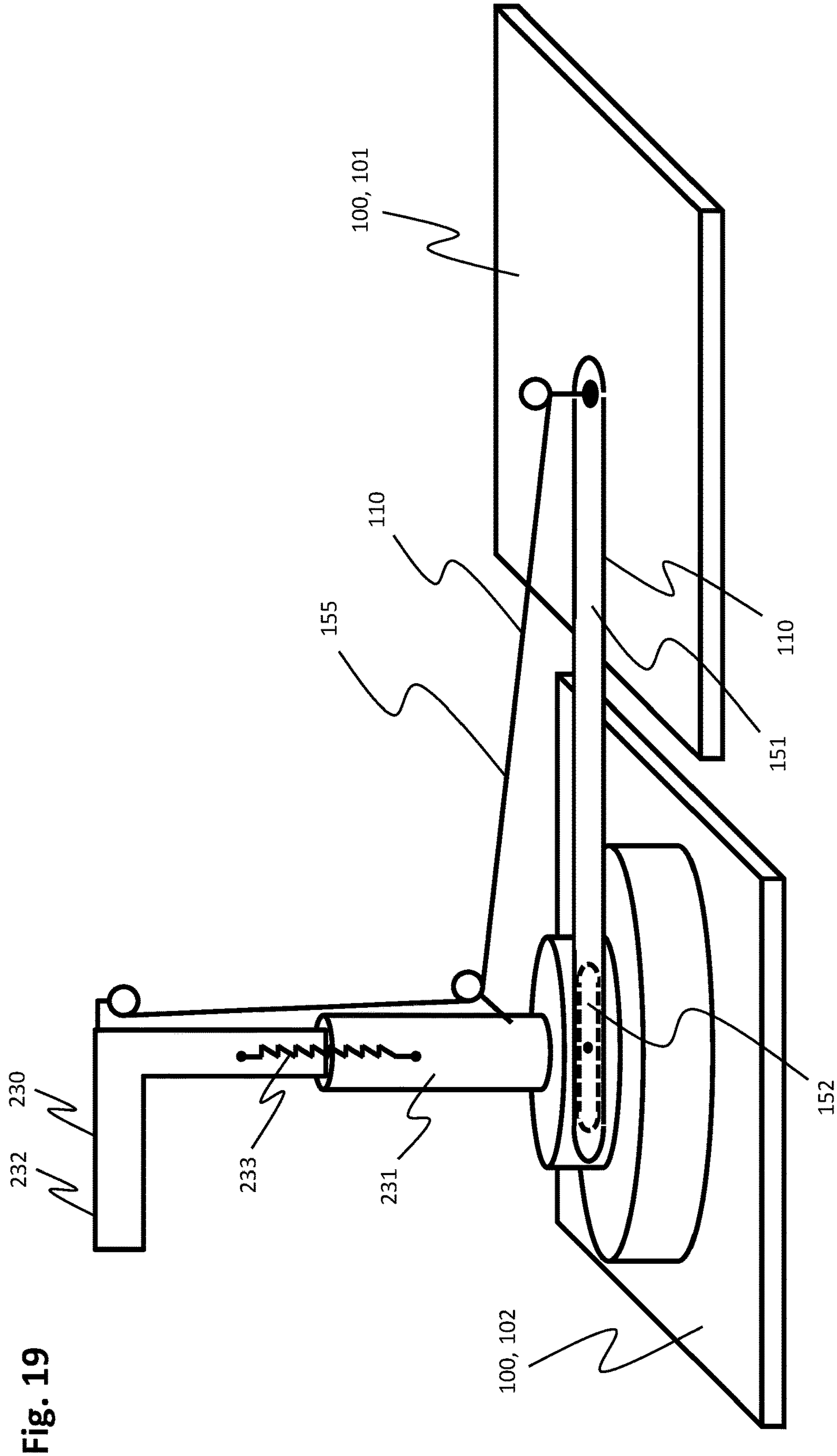
FIG. 19 shows an isometric view of two rotors of a planar drive system.

FIG. 19 shows an isometric view of a first rotor 101 and a second rotor 102. A rotatably mounted crane 230 is arranged on the second rotor 102. A coupling device 110 is arranged between the first rotor 101 and the second rotor 102. The coupling device 110 comprises a connecting rod 151, which is arranged on the rotatably mounted crane 230 with a longitudinal hole 152. With the aid of the longitudinal hole 152, the first rotor 101 may thereby be moved towards or away from the second rotor 102 without triggering a rotational movement of the rotatably mounted crane 230. This may be carried out without causing the second rotor 102 to move.

The coupling device 110 further comprises a rope connection 155, wherein a movement of the first rotor 101 away from the second rotor 102 with the aid of the rope connection 155 lowers the rotatably supported crane 230 and a movement of the first rotor 101 towards the second rotor 102 raises the rotatably supported crane 230. In order to assist in this, a spring 233 is further arranged to push an upper element 232 out of a lower element 231, the lower element 231 being connected to the second rotor 102. The upper element 232 may be lowered accordingly by the force against the spring 233 transmitted via the rope connection 155. A cord and/or wire may also be used in place of the rope connection 155. The rotatably mounted crane 230 may be appropriately rotated about the second rotor 102 with the aid of a coordinated movement of the first rotor 101 relative to the second rotor 102. Thus, a movement of the first rotor 101 may adjust both the height of the crane with the aid of the rope connection 155 and a rotational orientation of the crane 230 with the aid of the relative movement of the first rotor 101.

Figure 20:
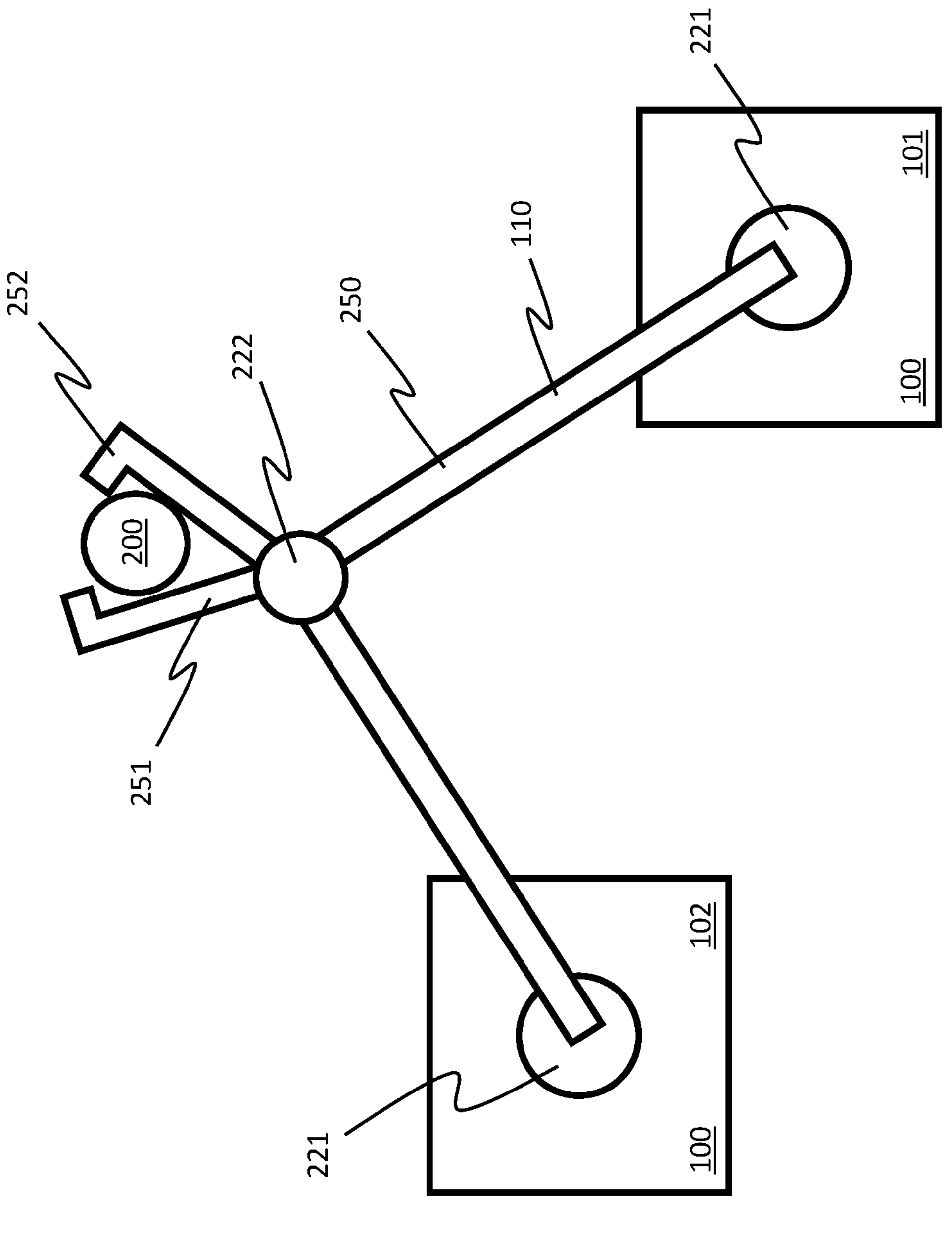
FIG. 20 shows a top view of two rotors of a planar drive system.

FIG. 20 shows a top view of two rotors 100 which are also connected to a coupling device 110. The coupling device 110 comprises a scissors element 250 with a first gripper 251 and a second gripper 252. The first gripper 251 and the second gripper 252 are connected to each other with the aid of a pivot element 222. The first gripper 251 is further connected to the first rotor 101 with the aid of a pivot bearing 221, and the second gripper 252 is connected to the second rotor 102 with the aid of a pivot bearing 221. Now, by a coordinated relative movement of the first rotor 101 and the second rotor 102, the first gripper 251 and the second gripper 252 may be opened and closed, and this may be used to hold an element 200.

Figure 21:
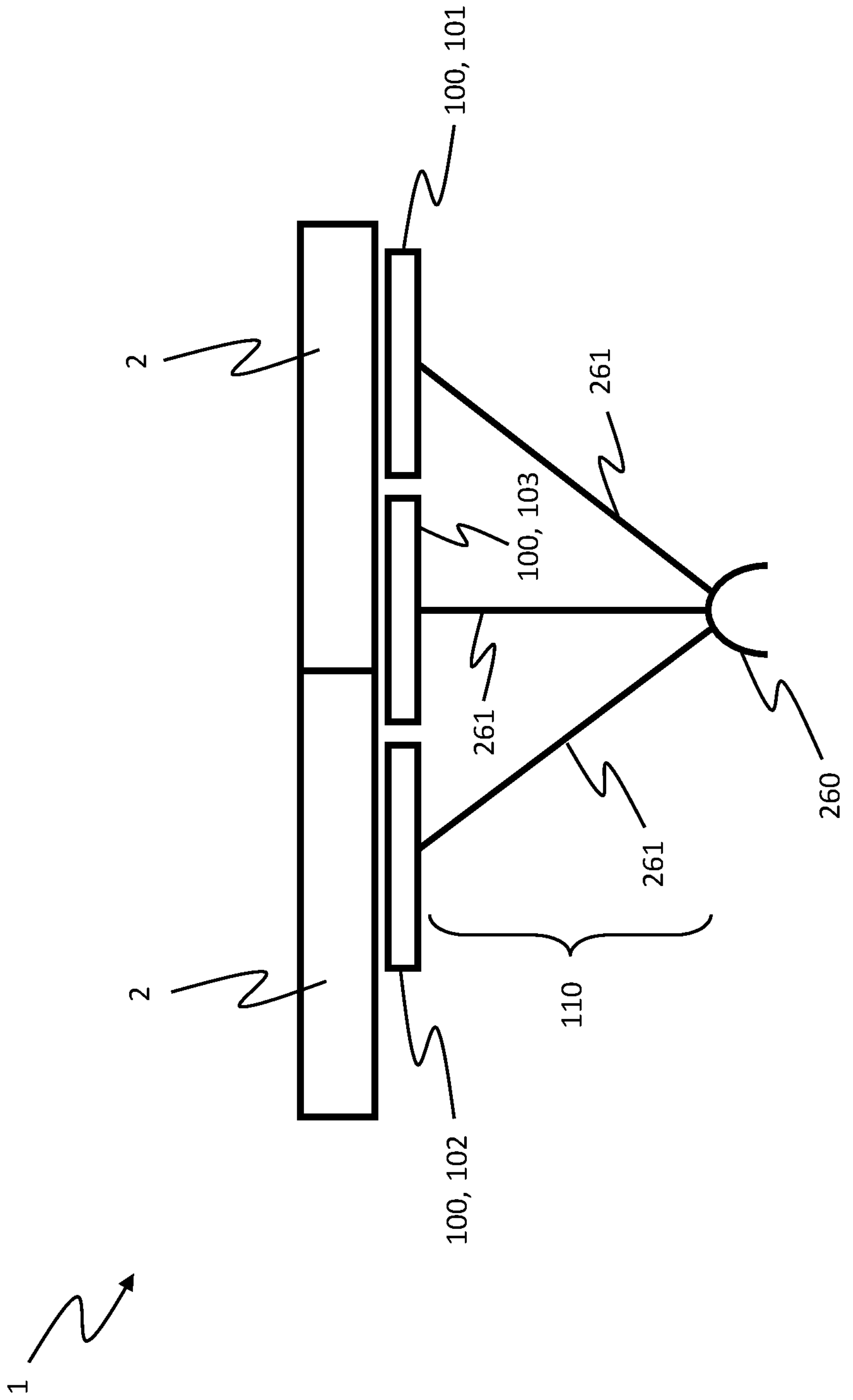
FIG. 21 shows a side view of a planar drive system.

FIG. 21 shows a side view of a planar drive system 1, in which case the rotors 100 are arranged below the stator modules 2. This is possible in principle, since the stator magnetic fields may also be used to provide a corresponding retaining force for the magnetic fields of the magnetic units 105. A first rotor 101 is connected to a second rotor 102 via a coupling device 110. The coupling device 110 is further connected to a third rotor 103. The coupling device 110 further comprises a gripper 260 connected to each of the first rotor 101, the second rotor 102, and the third rotor 103 by a respective gripper rod 261. A relative movement of the rotors 100 with respect to each other may control a position of the gripper 260 and also an opening angle of the gripper 260. One, more or all of the gripper rods 261 may also be replaced by ropes.

Figure 22:
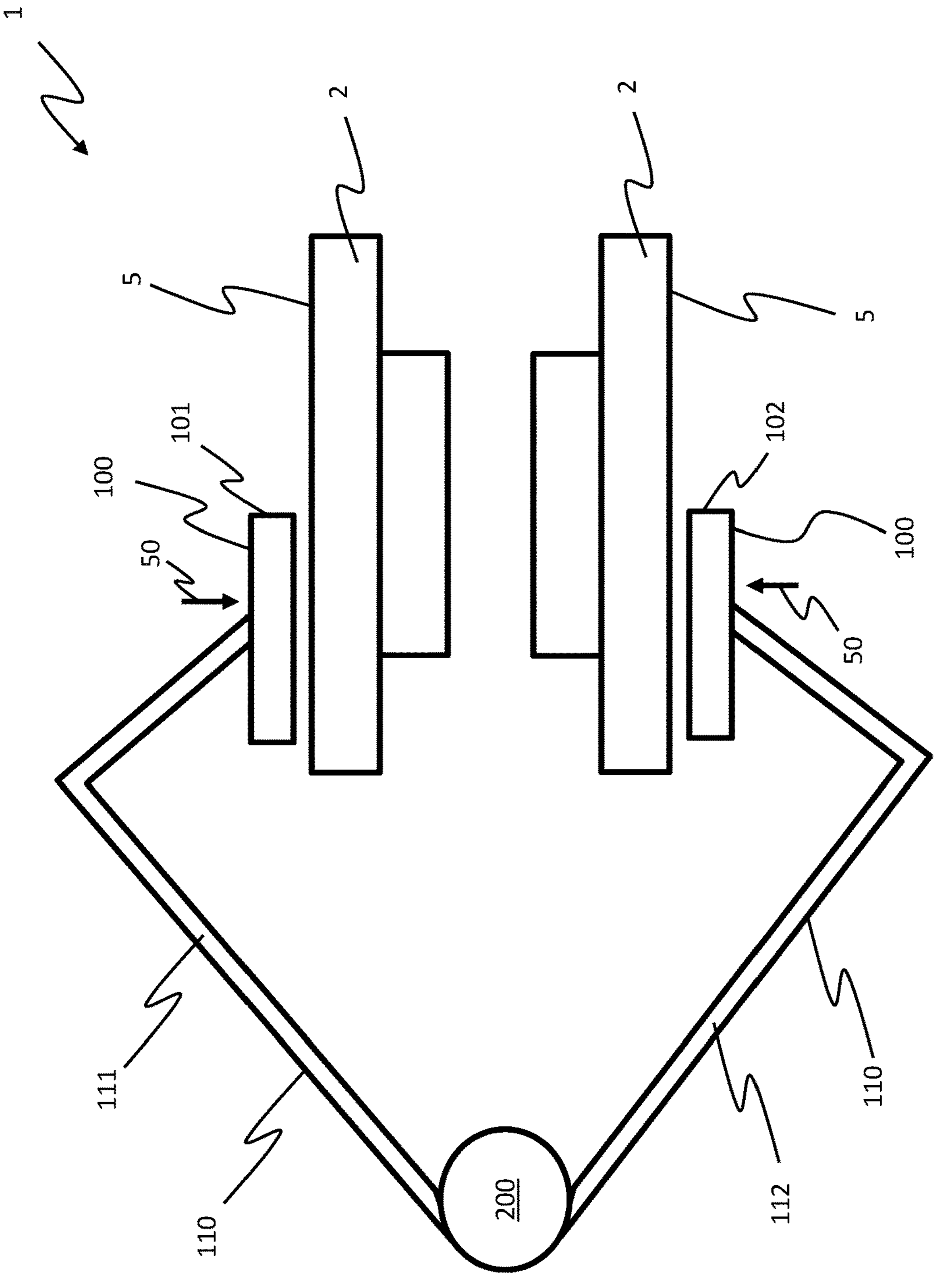
FIG. 22 shows a side view of a planar drive system.

FIG. 22 shows a side view of a planar drive system 1, in which two stator modules 2 are arranged opposite each other in such a way that the first rotor 101 is arranged on a first side of the arrangement of the two stator modules 2 and a second rotor 102 is arranged on a second side of the arrangement of the two stator modules 2. The stator surfaces 5 of the two stator modules 2 are parallel to each other. In this case, the coupling device 110 between the first rotor 101 and the second rotor 102 is guided around the stator modules 2 and again comprises a first coupling element 111 and a second coupling element 112, which are connected via a retained element 200. By moving the first rotor 101 and the second rotor 102 in coordination with each other, a position of the element 200 may be adjusted accordingly or the element 200 may also be released. A force 50 may be applied to the rotors 100 by the stator magnetic fields and the rotor magnetic fields, with the aid of which the first coupling element 111 and the second coupling element 112 act on the element 200 to hold the element 200 in place. If the rotors 100 are moved against the force 50 shown in FIG. 22, the element 200 may be released.

Figure 23:
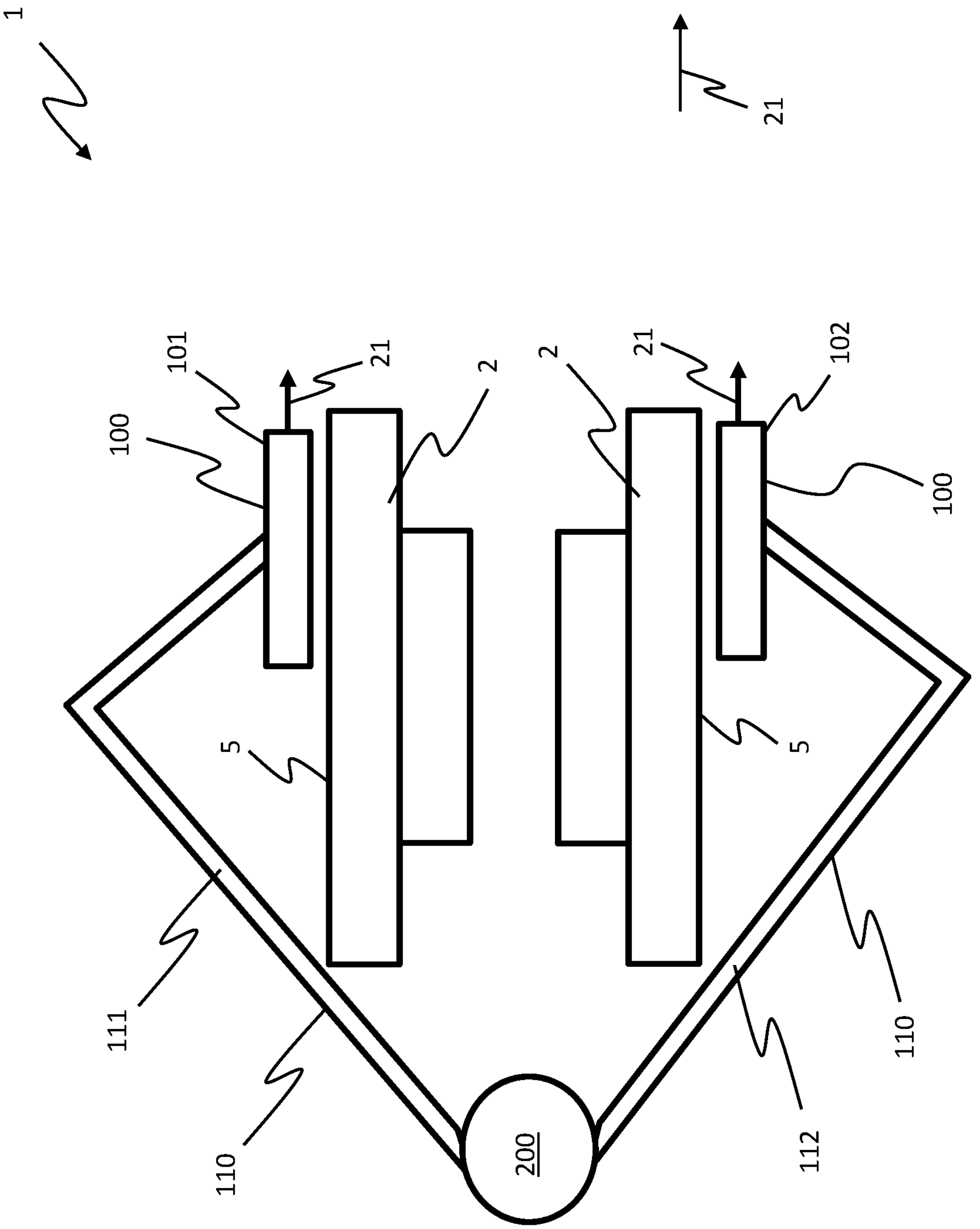
FIG. 23 shows a side view of a planar drive system.

FIG. 23 shows the planar drive system 1 of FIG. 22 after the first rotor 101 and the second rotor 102 have moved in the first direction 21.

Figure 24:
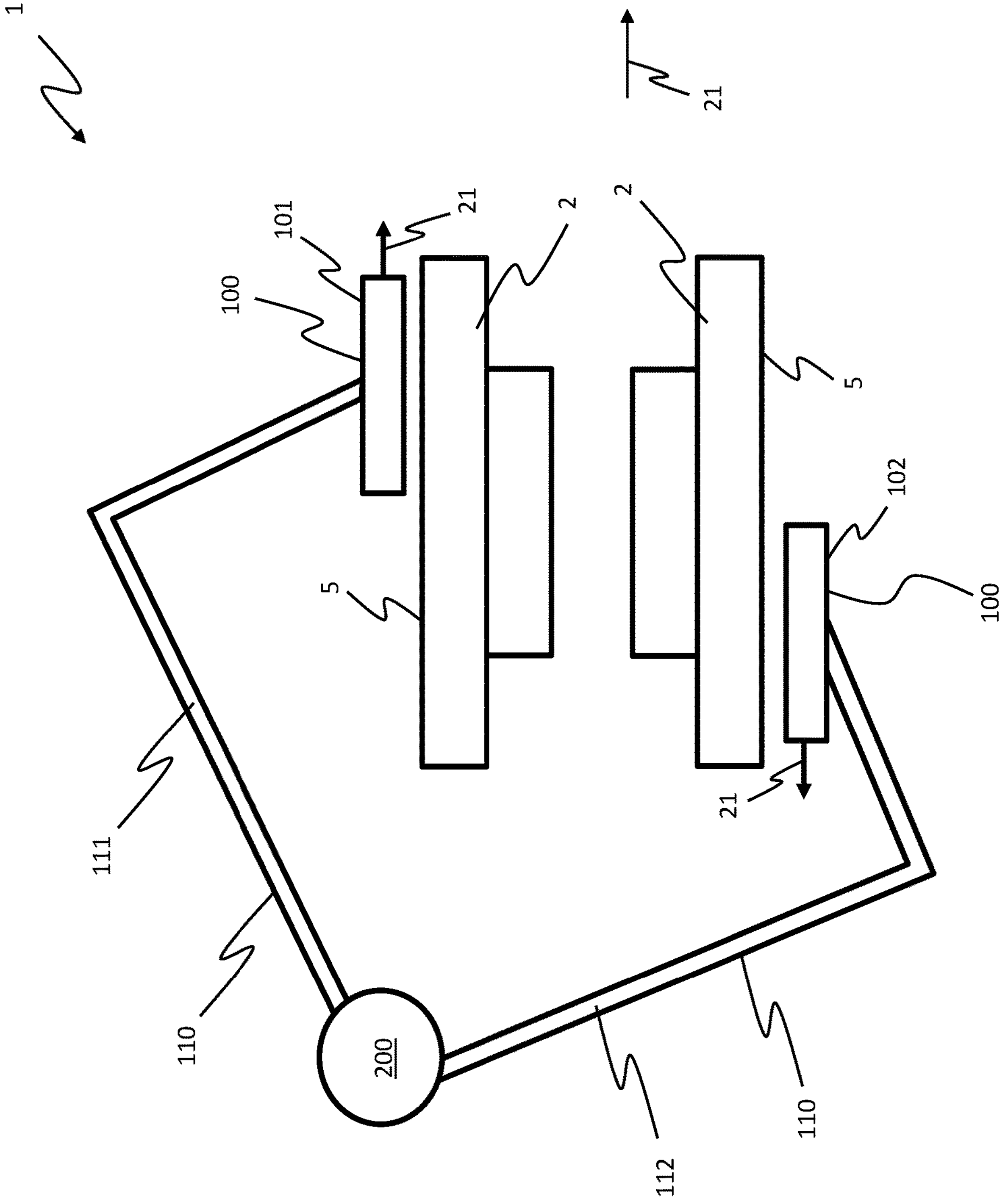
FIG. 24 shows a side view of a planar drive system.

FIG. 24 shows the planar drive system 1 of FIG. 22 after the first rotor 101 has moved in the first direction 21 and the second rotor 102 has moved opposite to the first direction 21. Thus, the second rotor 102 has moved antiparallel with regard to the first rotor 101. This allows for the element 200 being lifted in the direction of the first rotor 101.

Figure 25:
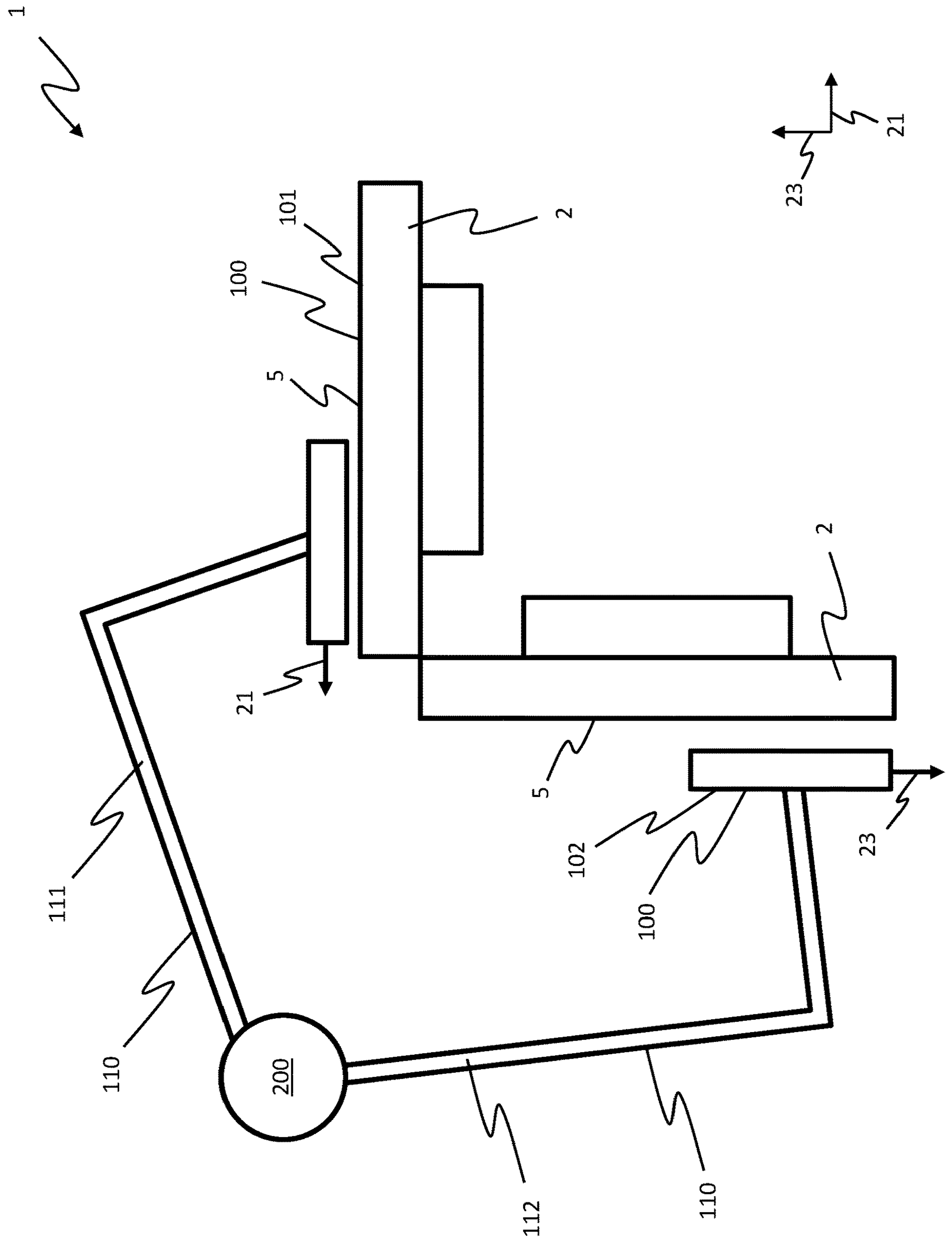
FIG. 25 shows a side view of a planar drive system.

FIG. 25 shows a side view of a planar drive system 1 similar in design to the planar drive system 1 of FIGS. 22 to 24. In this embodiment, the stator modules 2 are not arranged opposite to one another, but in such a way that their stator surfaces 5 are at a 90-degree angle to one another. Otherwise, a change in the position of the element 200 may again be made by moving the first rotor 101 or the second rotor 102 in parallel to the respective stator surface 5. Furthermore, other angles of the stator surfaces 5 with respect to one another are possible, as well.

Figure 26:
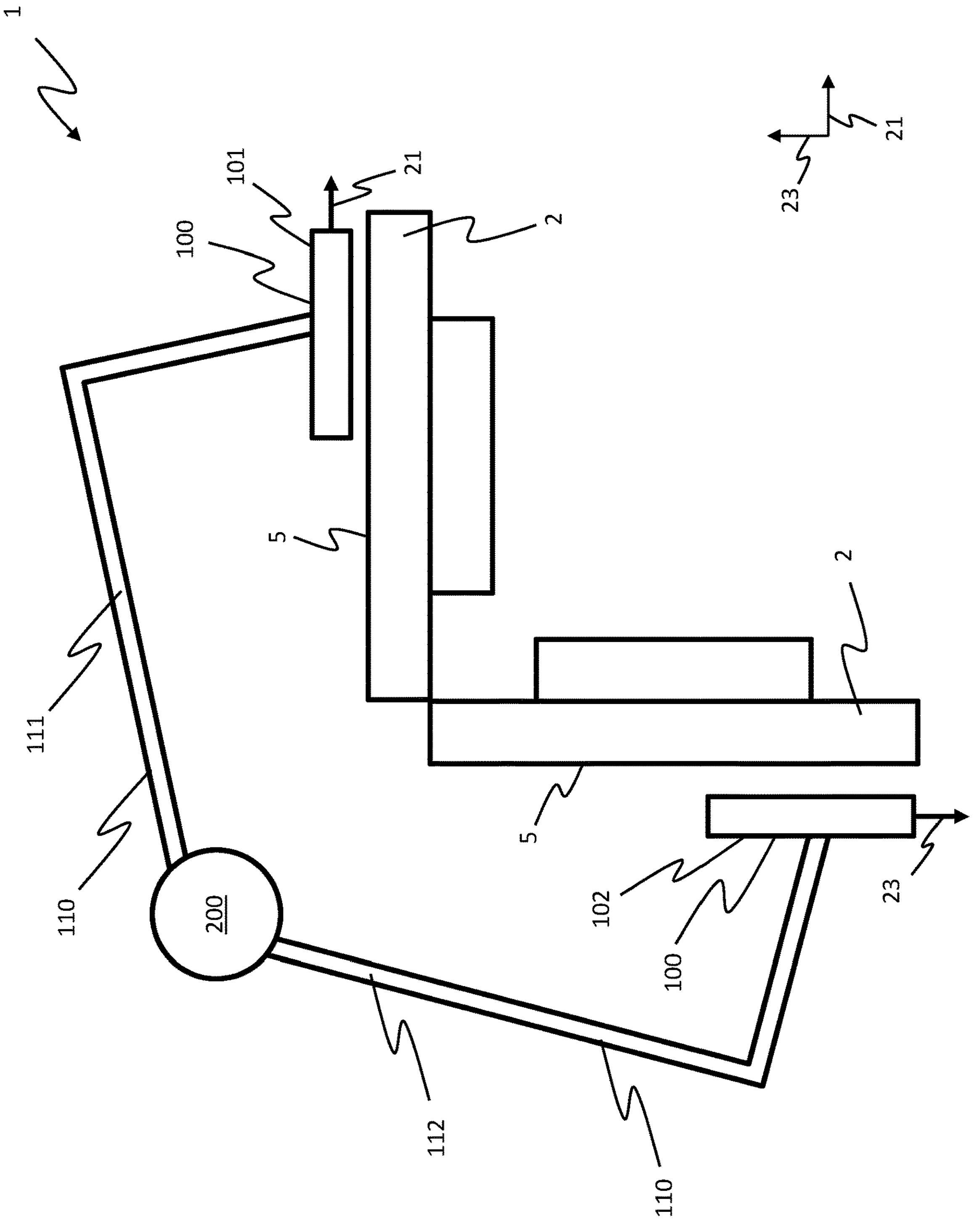
FIG. 26 shows a side view of a planar drive system.

FIG. 26 shows the planar drive system 1 of FIG. 25 after the first rotor 101 and the second rotor 102 have been moved accordingly.

Figure 27:
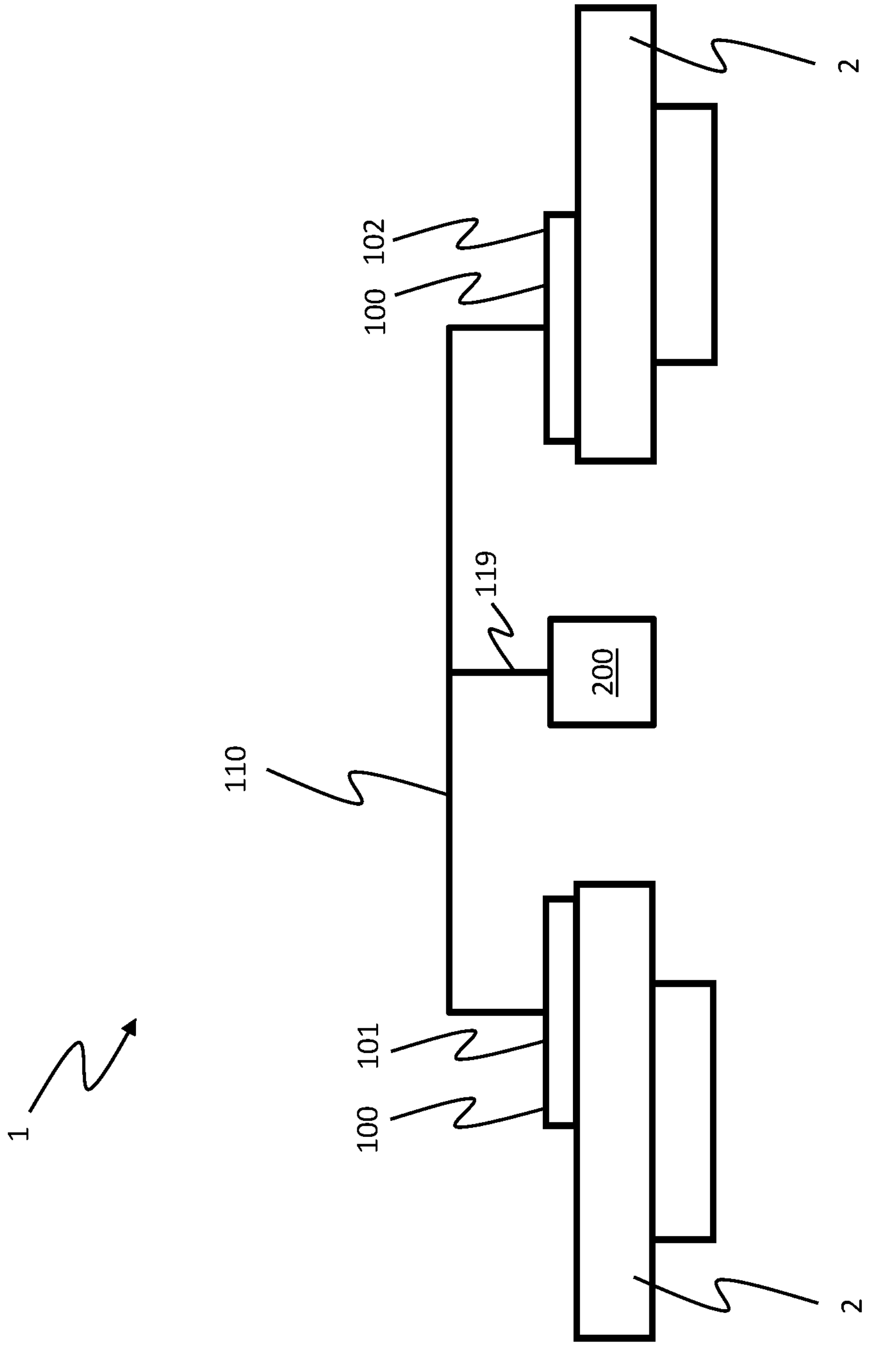
FIG. 27 shows a side view of a planar drive system.

FIG. 27 shows a side view of a planar drive system 1, in which a first rotor 101 and a second rotor 102 are connected to each other with the aid of a coupling device 110 and in which the first rotor 101 and the second rotor 102 may be moved in a coordinated manner. In this case, the first rotor 101 and the second rotor 102 are each arranged above a stator module 2, with a gap being arranged between these stator modules 2, i.e. the stator modules 2 are arranged at a distance from one another. A retaining element 119 connected to the coupling device 110 holds an element 200, which may again be a product transported by the planar drive system 1. In this embodiment example, it may be provided that the element 200 is accessible through the gap between the stator modules 2, for example for a processing step or for a visual inspection, for example with the aid of a camera.

TABLE 1

| List of reference numerals | |
|---|---|
| 1 | planar drive system |
| 2 | stator module |
| 3 | stator assembly |
| 4 | coil group |
| 5 | stator surface |
| 6 | magnetic field sensor |
| 7 | stator module housing |
| 10 | controller |
| 11 | data line |
| 21 | first direction |
| 22 | second direction |
| 23 | third direction |
| 50 | force |
| 100 | rotor |
| 101 | first rotor |
| 102 | second rotor |
| 103 | third rotor |
| 105 | magnet unit |
| 110 | coupling device |
| 111 | first coupling element |
| 112 | second coupling element |
| 114 | push rod |
| 116 | lifting device |
| 118 | clamping rod |
| 119 | retaining element |
| 121 | recess |
| 122 | protrusion |
| 123 | first edge element |
| 124 | second edge element |
| 127 | comb structure |
| 130 | magnet |
| 131 | north pole |
| 132 | south pole |
| 141 | rack |
| 142 | gear disk |
| 143 | threaded rod |
| 145 | coupling |
| 151 | connecting rod |
| 152 | longitudinal hole |
| 155 | rope connection |
| 200 | element |
| 201 | element protrusion |
| 210 | turntable |
| 220 | plate |
| 221 | pivot bearing |
| 222 | pivot element |
| 230 | crane |
| 231 | bottom element |
| 232 | top element |
| 233 | spring |
| 250 | scissors element |
| 251 | first gripper |
| 252 | second gripper |
| 260 | gripper |
| 261 | gripper rod |

What is claimed is:

1. A planar drive system comprising:

at least one stator assembly having in each case a plurality of coil groups for generating a stator magnetic field, a stator surface above the stator assembly, and further comprising a first rotor and a second rotor;

wherein the first rotor and the second rotor each comprise a plurality of magnet units for generating a rotor magnetic field, wherein the first rotor and the second are moveable above the stator surface at least in a first direction and a second direction with the aid of an interaction of the stator magnetic field with the rotor magnetic field, wherein a coupling device is arranged between the first rotor and the second rotor, wherein a connection is establishable between the first rotor and the second rotor with the aid of the coupling device, wherein the planar drive system comprises a controller, wherein the controller is configured to send control signals to the stator assembly, the stator assembly being configured to energize the coil groups on the basis of the control signals such that movements of the first rotor and of the second rotor coordinated with one another with respect to the coupling device are carried out with the aid of the stator magnetic field; and wherein the connection is releasable during operation, wherein the stator assembly is arranged to energize the coil groups on the basis of the control signals such that the connection is releasable and configured to be formed again.

2. The planar drive system according to claim 1, wherein the controller is operable in a first operating mode and in a second operating mode, wherein in the first operating mode, based on coupling information, the control signals are output such that the connection of the first rotor and the second rotor is taken into account, and wherein in the second operating mode, based on decoupling information, the control signals are output such that the first rotor and the second rotor are moved individually.

3. The planar drive system according to claim 1, wherein the first rotor comprises a first coupling element and the second rotor comprises a second coupling element, wherein the first coupling element and the second coupling element are part of the coupling device, wherein a form-fit connection and/or a mechanical force-fit connection and/or a magnetic force-fit connection is configurable between the first coupling element and the second coupling element.

4. The planar drive system according to claim 3, wherein the first coupling element and the second coupling element provide a mechanical coupling between the first rotor and the second rotor.

5. The planar drive system according to claim 3, wherein the first coupling element and the second coupling element provide a magnetic coupling between the first rotor and the second rotor.

6. The planar drive system according to claim 3, wherein the first coupling element comprises a recess, wherein the second coupling element comprises a protrusion matching the recess, wherein the connection is formed by inserting the protrusion into the recess.

7. The planar drive system according to claim 6, wherein for releasing, the first rotor and/or the second rotor are tiltable out of a plane defined by the first direction and the second direction.

8. The planar drive system according to claim 7, wherein the first rotor and the second rotor are tiltable in opposite directions to release the connection.

9. The planar drive system according to claim 3, wherein the first coupling element is integrated into a first circumferential edge element of the first rotor and wherein the second coupling element is integrated into a second circumferential edge element of the second rotor.

10. The planar drive system according to claim 3, wherein the first coupling element and the second coupling element comprise magnets.

11. The planar drive system according to claim 10, wherein the magnets of the first coupling element and/or of the second coupling element are supported in a rotatable manner.

12. The planar drive system according to claim 1, wherein the coupling device is arranged to trigger a movement of an element arranged on the second rotor by a movement of the first rotor relative to the second rotor.

13. A method for operating a planar drive system comprising:

at least one stator assembly having in each case a plurality of coil groups for generating a stator magnetic field, a stator surface above the stator assembly, and further comprising a first rotor and a second rotor;

wherein the first rotor and the second rotor each comprise a plurality of magnet units for generating a rotor magnetic field, wherein the first rotor and the second rotor are moveable above the stator surface at least in a first direction and a second direction with the aid of an interaction of the stator magnetic field with the rotor magnetic field, wherein a coupling device is arranged between the first rotor and the second rotor, wherein with the aid of the coupling device a connection is established between the first rotor and the second rotor, wherein the planar drive system comprises a controller, the controller outputting control signals to the stator assembly, the stator assembly energizing the coil groups on the basis of the control signals such that mutually coordinated movements of the first rotor and of the second rotor are carried out with the aid of the stator magnetic field, wherein the connection is released in operation, wherein the stator assembly energizes the coil groups based on the control signals such that the connection is released and formed again.

14. The method according to claim 13, wherein the controller is operable in a first operating mode and in a second operating mode, wherein in the first operating mode, based on coupling information, the control signals are output such that the connection of the first rotor and of the second rotor is taken into account, and wherein in the second operating mode, based on decoupling information, the control signals are output such that the first rotor and the second rotor are moved individually.

15. A planar drive system comprising:

at least one stator assembly having in each case a plurality of coil groups for generating a stator magnetic field, a stator surface above the stator assembly, and further comprising a first rotor and a second rotor;

wherein the first rotor and the second rotor each comprise a plurality of magnet units for generating a rotor magnetic field, wherein the first rotor and the second rotor are moveable above the stator surface at least in a first direction and a second direction with the aid of an interaction of the stator magnetic field with the rotor magnetic field, wherein a coupling device is arranged between the first rotor and the second rotor, wherein a connection is configurable between the first rotor and the second rotor with the aid of the coupling device, wherein the planar drive system comprises a controller, wherein the controller is configured to send control signals to the stator assembly, the stator assembly being configured to energize the coil groups on the basis of the control signals such that movements of the first rotor and of the second rotor coordinated with one another with respect to the coupling device are carried out with the aid of the stator magnetic field, wherein the stator assembly is arranged to energize the coil groups on the basis of the control signals such that the connection is releasable and configured to be formed again, wherein the controller is operable in a first operating mode and in a second operating mode, wherein in the first operating mode, based on coupling information, the control signals are output such that the connection of the first rotor and the second rotor is taken into account, and wherein in the second operating mode, based on decoupling information, the control signals are output such that the first rotor and the second rotor are moved individually, wherein determining the coupling information or the decoupling information, respectively, is carried out on the basis of the position of the first rotor and of the second rotor taking into account a dimension of the coupling device, wherein magnetic field sensors provided in the stator modules detect the magnetic fields of the magnet units of the first rotor and of the second rotor in order to detect the position of the first rotor and of the second rotor.

16. The planar drive system according to claim 15 wherein the first rotor comprises a first coupling element and the second rotor comprises a second coupling element, wherein the first coupling element and the second coupling element are part of the coupling device, wherein a form-fit connection and/or a mechanical force-fit connection and/or a magnetic force-fit connection is configurable between the first coupling element and the second coupling element.

17. The planar drive system according to claim 1, wherein the coupling device is arranged to trigger a movement of an element arranged on the second rotor by a movement of the first rotor relative to the second rotor.

* * * * *